United States Patent
Murphy et al.

(10) Patent No.: US 11,833,882 B2
(45) Date of Patent: Dec. 5, 2023

(54) SENSOR AND DATA PLATFORMS FOR VEHICLE ENVIRONMENTAL QUALITY MANAGEMENT

(71) Applicant: Aclima Inc., San Francisco, CA (US)

(72) Inventors: Robert Murphy, Alameda, CA (US); Meghan Elizabeth Thurlow, San Francisco, CA (US); Melissa M. Lunden, Berkeley, CA (US); Davida Herzl, San Diego, CA (US); Matthew Hill, San Francisco, CA (US)

(73) Assignee: Aclima Inc., San Francisco, CA (US)

( * ) Notice: Subject to any disclaimer, the term of this patent is extended or adjusted under 35 U.S.C. 154(b) by 431 days.

(21) Appl. No.: 16/773,873

(22) Filed: Jan. 27, 2020

(65) Prior Publication Data

US 2020/0238786 A1 Jul. 30, 2020

Related U.S. Application Data

(60) Provisional application No. 62/798,395, filed on Jan. 29, 2019.

(51) Int. Cl.
*B60H 1/00* (2006.01)
*B60H 3/06* (2006.01)
*B60H 1/24* (2006.01)

(52) U.S. Cl.
CPC ......... *B60H 1/008* (2013.01); *B60H 1/00771* (2013.01); *B60H 1/00792* (2013.01); *B60H 1/00821* (2013.01); *B60H 1/00978* (2013.01); *B60H 1/24* (2013.01); *B60H 3/0608* (2013.01)

(58) Field of Classification Search
CPC ............... B60H 1/008; B60H 1/00771; B60H 1/00792; B60H 1/00821; B60H 1/00978; B60H 1/24; B60H 3/0608; B60H 1/0076; G05D 1/0055
USPC .......................................................... 454/75
See application file for complete search history.

(56) References Cited

U.S. PATENT DOCUMENTS

| | | | |
|---|---|---|---|
| 8,092,285 B2 * | 1/2012 | Mathur | B60H 1/00764 454/75 |
| 9,682,610 B2 | 6/2017 | Duan | |
| 10,828,959 B2 * | 11/2020 | Duan | B60H 3/00 |
| 2016/0103111 A1 | 4/2016 | Griffin | |
| 2016/0318368 A1 | 11/2016 | Alger | |
| 2017/0206464 A1 | 7/2017 | Clayton | |
| 2017/0274737 A1 * | 9/2017 | Delaruelle | B60H 1/00771 |
| 2018/0149383 A1 | 5/2018 | Martin | |
| 2020/0346511 A1 * | 11/2020 | Hasegawa | B60H 1/008 |

FOREIGN PATENT DOCUMENTS

| | | |
|---|---|---|
| DE | 102016105135 | 9/2016 |
| FR | 3051145 | 5/2018 |
| GB | 2551947 | 1/2018 |

(Continued)

*Primary Examiner* — Avinash A Savani
*Assistant Examiner* — Dana K Tighe
(74) *Attorney, Agent, or Firm* — Van Pelt, Yi & James LLP

(57) ABSTRACT

A method and system for utilizing environmental data are described. The method includes receiving external environmental data and receiving in-cabin environmental data. A mitigation action for an in-cabin environment of a vehicle is provided. The mitigation action is based on the external environmental data and the in-cabin environmental data.

8 Claims, 8 Drawing Sheets

(56) References Cited

FOREIGN PATENT DOCUMENTS

| | | | |
|---|---|---|---|
| JP | H08072535 | 3/1996 | |
| JP | 2004322880 | 11/2004 | |
| JP | 2017052339 | 3/2017 | |
| JP | 2017077885 | 4/2017 | |
| JP | 2018114981 | 7/2018 | |
| WO | 2006057550 | 6/2006 | |
| WO | WO-2019082395 A1 * | 5/2019 | ......... B60H 1/00785 |

* cited by examiner

1200

One way commute insight

"During your commute, your in-cabin PM 2.5 levels were 6 times lower than outdoor PM 2.5 levels on average."

1300

Two way commute insight

"In-cabin and outdoor PM 2.5 concentrations were 5 and 10 times higher respectively during the forward commute."

1400

Commute Comparison

"The outdoor PM 2.5 concentrations on Wednesday were on average 2 times higher than on Thursday..."

1500

Commute Comparison

"...however the indoor PM 2.5 concentrations on Thursday were on average 3 times higher than on Wednesday."

SENSOR AND DATA PLATFORMS FOR VEHICLE ENVIRONMENTAL QUALITY MANAGEMENT

CROSS REFERENCE TO OTHER APPLICATIONS

This application claims priority to U.S. Provisional Patent Application No. 62/798,395 entitled SENSOR AND DATA PLATFORM FOR VEHICLE ENVIRONMENTAL QUALITY MANAGEMENT filed Jan. 29, 2019 which is incorporated herein by reference for all purposes.

BACKGROUND OF THE INVENTION

Commuters frequently spend a significant amount of time traveling to and from work. Many commuters travel by car, truck, van or bus or share roads on which such vehicles travel. Such roads are often the location of severe localized air pollution. For example, pollutants or contaminants such as nitrogen dioxide ($NO_2$), carbon monoxide (CO), nitrogen oxide (NO), ozone ($O_3$), sulphur dioxide ($SO_2$), carbon dioxide ($CO_2$), methane ($CH_4$), volatile organic compounds (VOCs), radiation and particulate matter may be encountered while on the road. Exposure to such air pollution can have near-term and long-term health impacts not only for commuters but also for communities surrounding the roadways. Poor air quality can also undermine road safety by affecting driver cognition. It is desirable to sense these and other pollutants and provide a mechanism for individuals navigating the roadways to understand and/or mitigate the effects of such pollutants.

BRIEF DESCRIPTION OF THE DRAWINGS

Various embodiments of the invention are disclosed in the following detailed description and the accompanying drawings.

DETAILED DESCRIPTION

Figure 1:
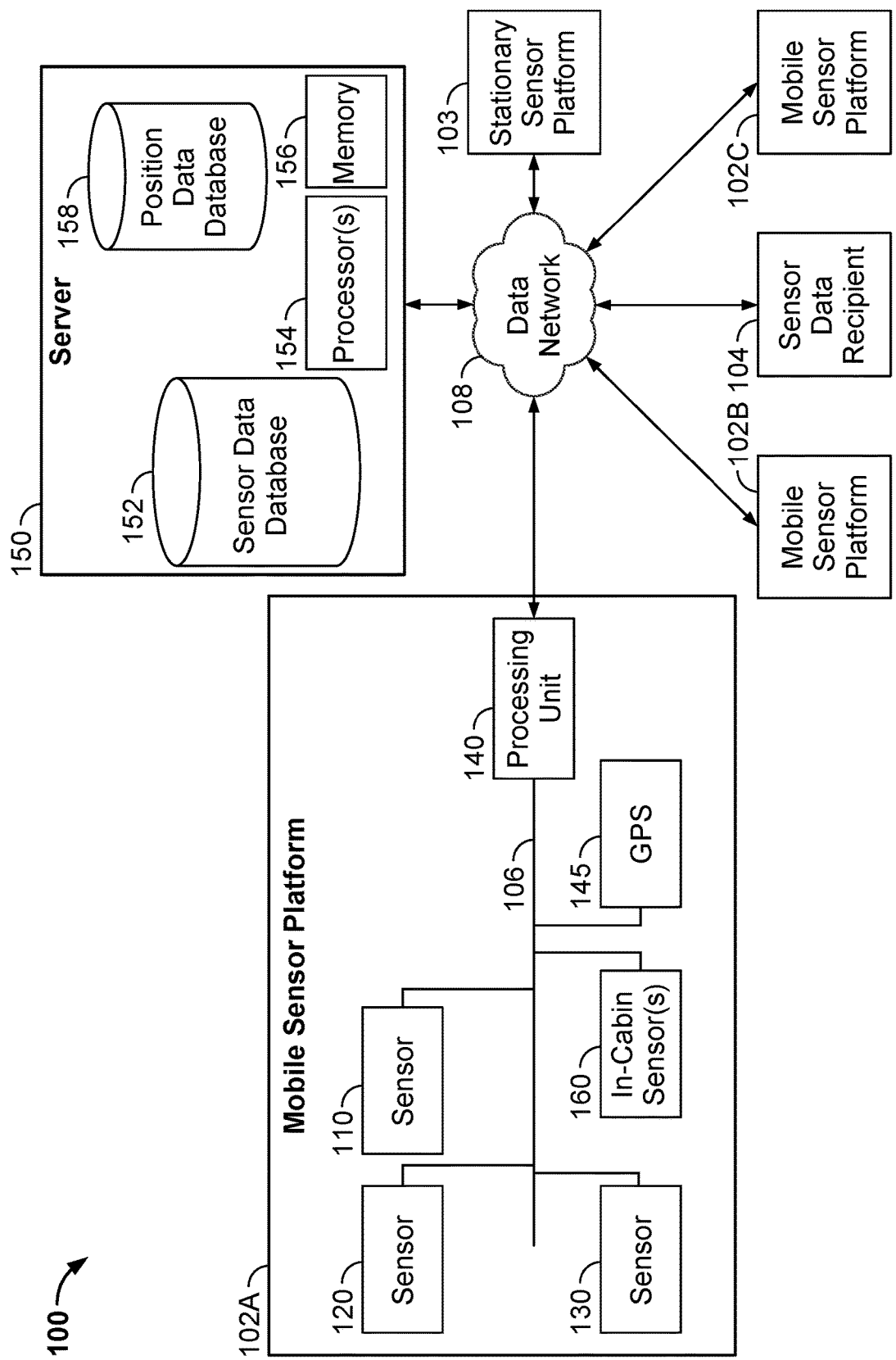
FIG. 1 depicts an embodiment of a system for collecting and processing environmental data.

The invention can be implemented in numerous ways, including as a process; an apparatus; a system; a composition of matter; a computer program product embodied on a computer readable storage medium such as a tangible and/or nontransitory computer readable medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Environmental data includes measurements of pollutants, contaminants and/or other components of the environment. Environmental quality can be assessed based on this environmental data and is a measure of the suitability of the surroundings for humans. An important aspect of environmental quality is air quality. Environmental data thus includes but is not limited to measurements related to air quality (e.g. the presence or absence of various pollutants in the air) as well as other features of the surroundings. Environmental data may be captured using mobile and/or stationary sensor platforms and may include measurements of pollutants, contaminants, and/or other conditions. For example, environmental data may be gathered on nitrogen dioxide ($NO_2$), carbon monoxide (CO), nitrogen oxide (NO), ozone ($O_3$), sulphur dioxide ($SO_2$), carbon dioxide ($CO_2$), methane ($CH_4$), volatile organic compounds (VOCs), particulate matter (PM), radiation, noise, temperature, other pathogens and/or other conditions that may affect humans.

Individuals frequently travel via roads for a variety of purposes, including but not limited to commuting. Road travel, for commuting and other purposes, often occurs in vehicles which emit varying amounts of air pollutants. Consequently, roads are often the location and source of air pollution. The most severe air pollution many individuals face each day is on-road, and in many cases, in vehicle cabins. Further, vehicles on roads may be the source of contaminants that affect surrounding areas. Thus, environmental data collected on and around roads is desired to be used to provide information to surrounding communities regarding the environmental quality and to assess exposure to pollutants.

A method and system for obtaining and/or utilizing environmental data are described. Environmental data includes external environmental data and/or in-cabin environmental data. External environmental data includes processed and/or unprocessed sensor data that measures pollutants, contaminants and/or other components of the environment outside of a vehicle cabin. For example, external environmental data may include measurements of $NO_2$, CO, NO, $O_3$, $SO_2$, $CO_2$, $CH_4$, VOCs, PM, radiation, noise, temperature, other pathogens and/or other conditions that are in a sample taken from outside of the vehicle. In-cabin environmental data includes processed or unprocessed sensor data that measures such pollutants, contaminants and/or other components of the environment within a vehicle cabin. For example, in-cabin environmental data may include measurements of $NO_2$, CO, NO, $O_3$, $SO_2$, $CO_2$, $CH_4$, VOCs, PM, radiation, noise, temperature, other pathogens and/or other conditions that are in a sample taken from inside of the vehicle cabin. In-cabin environmental data may be related to external environmental data because air surrounding the vehicle may enter the vehicle cabin, for example via windows or ventilation systems.

In some embodiments, external environmental sensors as well as in-cabin environmental sensors may be deployed in a variety of vehicles. For example, fleet vehicles (e.g. buses and taxis owned or operated by a single entity) as well as individuals' personal vehicles may have sensor platforms incorporated. External environmental sensors may be part of sensor platforms that may be mounted on vehicles or may be incorporated into the vehicle. In-cabin sensors may be incorporated into the vehicles, for example in ventilation systems, or may be mounted on the vehicles. The data from the external and/or in-cabin environmental sensors may be processed and utilized at the vehicle and/or may be sent to centralized system(s). The centralized system(s) may receive data from a variety of sources, such as stationary sensor platforms and vehicles having external environmental sensors and/or in-cabin environmental sensors. The centralized system(s) may provide further processing of environmental data. The processed environmental data may be provided, for example via a subscription service, to vehicles, communities and/or other users. In some embodiments, some or all vehicles that are part of the system may send data directly to other vehicle(s) that are part of the system.

In some embodiments, the method includes receiving external environmental data and receiving in-cabin environmental data. External environmental data may include detection and measurement of pollutants or contaminants such as nitrogen dioxide, carbon monoxide, nitrogen oxide, ozone, sulphur dioxide, carbon dioxide, methane, VOCs, radiation and PM outside of a vehicle. In-cabin environmental data may include detection and measurement within the vehicle's cabin of some or all of the same constituents as external environmental data and/or additional pollutants or contaminants. Sources of such in-cabin contaminants may include the occupants (e.g. $CO_2$ from exhaling, hydrocarbons from cigarettes smoke), the vehicle (e.g. compounds outgassing from surfaces of the vehicle such as the dashboard) and external pollutants (e.g. pollutants that enter through the vehicle's ventilation system).

Environmental data may be received from one or more of data sources. In some embodiments, the external environmental data includes sensor data from sensors on the vehicle. For example, a sensor platform that receives and senses components of the air outside of the vehicle may be mounted on or incorporated into the structure of the vehicle. In some embodiments, the external environmental data is received from external source(s) separate from the vehicle. For example, the external source(s) of external environmental data may include stationary data platforms and/or sensor data platforms on other vehicles (e.g. other vehicles within a particular distance of the vehicle and vehicles previously traversing the same region). Such data may be processed or may be raw sensor data. In some embodiments, the external source(s) may also include services or other providers of environmental data sets or modeled data. Similarly, the in-cabin environmental data may include sensor data from in-cabin sensors on the vehicle, sensor data from in-cabin sensors on other similar vehicles in the region, other data sets and modeled data, for example from a simulation of the cabin of the vehicle. Thus, external and in-cabin environmental data may be received from a variety of data sources.

In some embodiments, the external environmental quality and/or in-cabin environmental quality are determined. For example, determining the external environmental quality for the vehicle may include including weighting the external environmental data. This weighting based on one or more of: a location of the external source of the sensor data (e.g. the distance to the corresponding vehicle or stationary sensor platform), an age of a sensor corresponding to the external environmental data, an expected lifetime of the sensor, an interval since a last calibration of the sensor, vehicle speed, the time at which the data was collected, a number of vehicles within the particular distance providing the external environmental data, and/or other factors. The weighted, processed external environmental data may be compared with one or more standards to determine the external environmental quality.

Similarly, determining the in-cabin environmental quality of the vehicle may include correcting any in-cabin environmental data received from the external source(s) for singularities (e.g. smoking in the other vehicle, number of occupants of the other vehicle) and/or weighting the in-cabin environmental data. The weight may be based on one or more of: a location of the external source of the sensor data (e.g. distance to the corresponding vehicle or stationary sensor platform), an age of a sensor corresponding to the in-cabin environmental data, an expected lifetime of the sensor, an interval since a last calibration of the sensor, vehicle speed, the time at which the data was collected, a number of other vehicles providing the in-cabin environmental data and/or other factors. The weighted, processed in-cabin environmental data may be compared with one or more standards to determine the in-cabin environmental quality.

In order to improve the reliability of the external environmental data and the in-cabin environmental data over time, the external and/or in-cabin environmental sensors may be calibrated. In some embodiments, this may include normal calibration of the sensors. However, in some instances, the sensors in a vehicle may not be readily available. For example, the time between services for a vehicle (at which time the sensor may be available for calibration or replacement) may be longer than the expected lifetime of the sensor. In some such embodiments, the calibration utilizes data from other similar sensors. Utilizing data form other sensor may be particularly useful when newly calibrated sensors are in close proximity or under reasonably similar conditions that make inference more reliable. For example, as a sensor ages, data from newer sensors, particularly those nearby or under similar conditions, may be utilized to correct or replace data from the older sensor. The nature and frequency of the calibration may thus depend upon factors such as one or more of the age of the sensor, an expected lifetime of the sensor, the availability of replacements, and the ability to replace the sensor. In some embodiments, sensors may be periodically replaced.

The method also includes providing a mitigation action for an in-cabin environment of a vehicle based on the external and in-cabin environmental data. The mitigation action may include one or more of: ventilating the vehicle, enclosing the vehicle, engaging an air recirculation system, incorporating an air filtration system into a ventilation system of the vehicle, providing information regarding the environmental quality, providing an alternate route and/or providing another mechanism for addressing the in-cabin environment to which occupants are exposed. To provide the mitigation action, the external environmental quality and/or the in-cabin environmental quality may be compared to standards to determine the environmental quality and whether the mitigation action is warranted. Further, the external environmental quality may be compared to the in-cabin environmental quality. In some embodiments, providing the mitigation action includes notifying the occupants of the vehicle that a mitigation action is desirable. In some embodiments, providing the mitigation action includes carrying out the mitigation action. In some embodiments, the mitigation action may be based an additional predetermined data distinct from the in-cabin sensor data and the external sensor data. If the external and/or in-cabin environmental data is unavailable, the predetermined data may be used in lieu of the sensor data. For example, the external environmental quality may be determined using the predetermined data if the external environmental data is unavailable. Thus, environmental quality and mitigation actions may be determined even if the vehicle is in a region where current data or data processing is not available. In some embodiments, the mitigation action may be determined based on the specific mitigation features available in the vehicle, such as the presence or absence of filter(s) in the vehicle's ventilation system.

The external environmental data and the in-cabin environmental data may also be mapped. This mapping may be in addition to or part of the mitigation actions described above. For example, poor environmental quality in certain areas that the vehicle has passed through or will traverse may be indicated on a map. As a result, an individual may make decisions related to their driving.

FIG. 1 depicts an embodiment of a system 100 for collecting, processing and utilizing environmental data. For clarity, only some components are shown. System 100 includes multiple mobile sensor platforms 102A, 102B, 102C (collectively mobile sensor platforms 102) and server 150. Although three mobile sensor platforms 102 are shown, another number may be used. Mobile sensor platforms 102 are mounted in vehicles. For example, mobile sensor platforms 102 may be mounted on vehicles owned by owner of system 100, fleet vehicles, personal vehicles or other transportation mechanism. Similarly, server 150 may be owned by the same or a different entity as mobile sensor platforms 102 and/or the vehicles in which mobile sensor platforms 102 are housed. In some embodiments, system 100 may also include one or more stationary sensor platforms 103, of which one is shown. Stationary sensor platform 103 may be used to collect environmental data at a fixed location. The environmental data collected by stationary sensor platform 103 may supplement the data collected by mobile sensor platforms 102. Thus, stationary sensor platform 103 may have sensors that are the same as or analogous to the sensors for mobile sensor platforms 102. In other embodiments, stationary sensor platform 103 may be omitted. Also shown is data recipient 104. Although one data recipient 104 is shown, multiple may be present. Data recipient 104 corresponds to a vehicle which may receive data from server 150, mobile sensor platforms 102 and/or stationary sensor platform 102. However, data recipient 104 does not provide environmental data to system 100. Although a single server 150 is shown, multiple servers may be used. The multiple servers may be in different locations. Mobile sensor platforms 102, stationary sensor platform(s) 103 and data recipient 105 may communicate with server 150 via a data network 108. The communication may take place wirelessly.

Mobile sensor platforms 102 may be mounted in or incorporated into vehicles, such as automobiles, buses, vans and/or drones. In some embodiments, mobile sensor platforms 102 are desired to stay in proximity to the ground to be better able to sense conditions analogous to what a human would experience. Mobile sensor platform 102A includes a bus 106, sensors 110, 120 and 130. Although three sensors are shown, another number may be present on mobile sensor platform 102A. In addition, a different configuration of components may be used with sensors 110, 120 and 130. Each sensor 110, 120 and 130 is used to sense environmental data and may be of primary interest to a user of system 100. For example, sensors 110, 120 and 130 may be gas sensors, volatile organic compound (VOC) sensors, particulate matter sensors, radiation sensors, noise sensors, light sensors, temperature sensors, noise sensors or other analogous sensors that capture variations in the environment. For example, sensors 110, 120 and 130 may be used to sense one or more of $NO_2$, CO, NO, $O_3$, $SO_2$, $CO_2$, VOCs, CH4, particulate matter, noise, light, temperature, radiation and other compounds. In some embodiments, sensor 110, 120 and/or 130 may be a multi-modality sensor. A multi-modality gas sensor senses multiple gases or compounds. For example, if sensor 110 is a multi-modality $NO_2/O_3$ sensor, sensor 110 might sense both $NO_2$ and $O_3$ together.

Also shown are in-cabin sensor(s) 160. Although depicted as part of mobile sensor platform 102A, in-cabin sensor(s) 160 may simply be mounted on or incorporated into the same vehicle that houses mobile sensor platform 102A. For example, in-cabin sensor(s) 160 may be part of the corresponding vehicle's ventilation system. In-cabin sensor(s) 160 may sense one or more of $NO_2$, CO, NO, $O_3$, $SO_2$, $CO_2$, VOCs, CH4, particulate matter, noise, light, temperature, radiation and other compounds. For example, in-cabin sensor(s) 160 may be sense exhalations from passengers (e.g. $CO_2$), components of smoke from passengers' cigarettes, outgassing from components of the vehicle such as the dashboard, and other contaminants that might be present in the vehicle's cabin. Although shown as separate from external sensors 110, 120 and 130, some or all of in-cabin sensor(s) 160 may be the same as external sensors 110, 120 and 130. In other words, sensors 110, 120 and 130 may sense both the external environment and the in-cabin environment in some embodiments. For example, if there is a valve system that operates on a duty cycle from two different intake locations (in-cabin and outdoor), in-cabin and external samples may be collected and measured using the same set of sensors. Thus, although described in the context of separate in-cabin and external sensors, in some embodiments, a single set of sensors may be used for both environments.

Although not shown in FIG. 1, other sensors co-located with sensors 110, 120, 130 and 160 may be used to sense characteristics of the surrounding environment including, in some instances, other gases and/or matter. Such additional sensors are exposed to the same environment as sensors 110, 120, 130 and 160. In some embodiments, such additional sensors are in close proximity to sensors 110, 120 and 130, for example within ten millimeters or less. In some embodiments, the additional sensors may be further from sensors 110, 120, 130 and 160 if the additional sensors sample the same packet of air inside of a closed system, such as a system of closed tubes. In some embodiments, temperature and/or pressure are sensed by these additional sensors. For example, an additional sensor co-located with sensor 110 may be a temperature, pressure and relative humidity (T/P/RH) sensor. These additional co-located sensors may be used to calibrate sensors 110, 120, 130 and/or 160. Although not shown, sensor platform 102A may also include a manifold for drawing in air and transporting air to sensors 110, 120 and 130 for testing.

Sensors 110, 120 and 130 provide sensor data over bus 106, or via another mechanism. In some embodiments, data from sensors 110, 120 and 130 incorporates time. This time may be provided by a master clock (not shown) and may take the form of a timestamp. Master clock may reside on sensor platform 102A, may be part of processing unit 140, or may be provided from server 150. As a result, sensors 110, 120 and 130 may provide timestamped sensor data to server 150. In other embodiments, the time associated with the sensor data may be provided in another manner. Because sensors 110, 120 and 130 generally capture data at a particular frequency, sensor data is discussed as being associated with a particular time interval (e.g. the period associated with the frequency), though the sensor data may be timestamped with a particular value. For example, sensors 110, 120 and/or 130 may capture sensor data every second, every two seconds, every ten seconds, or every thirty seconds. The time interval may be one second, two seconds, ten seconds or thirty seconds. The time interval may be the same for all sensors 110, 120 and 130 or may differ for different sensors 110, 120 and 130. In some embodiments, the time interval for a sensor data point is centered on the timestamp. However, other mechanisms for defining the time interval may be used.

In the embodiment shown, in-cabin sensor(s) 160 also provide sensor data over bus 106, or via another mechanism. In some embodiments, data from in-cabin sensor(s) 160 incorporates time. This time may be provided by a master clock, as described above with respect to sensors 110, 120 and 130. Because in-cabin sensor(s) 160 generally capture data at a particular frequency, sensor data is discussed as being associated with a particular time interval (e.g. the period associated with the frequency), though the sensor data may be timestamped with a particular value. In some embodiments, the time interval for a sensor data point is centered on the timestamp. Other mechanisms for defining the time interval may be used. In some embodiments, sensors for sensor platforms 102, in-cabin sensor(s) 160 and/or stationary platform 103 undergo a thorough pre-deployment calibration procedure. In some embodiments, the pre-deployment calibration may be completed alongside Environmental Protection Agency-designated regulatory-grade instruments or appropriate best-in-class-technologies. Pre-deployment calibration also allows for identification and replacement of errant individual sensors. As discussed above, sensors for platforms 102 and in-cabin sensors 160 may also be calibrated during use.

Sensor platform 102A also includes a position unit 145 that provides position data. In some embodiments, position unit 145 is a global positioning satellite (GPS) unit. Consequently, system 100 is described in the context of a GPS unit 145. The position data may be time-stamped in a manner analogous to sensor data. Because position data is to be associated with sensor data, the position data may also be considered associated with time intervals, as described above. However, in some embodiments, position data (e.g. GPS data) may be captured more or less frequently than sensor data. Thus, multiple data points for the position data may be associated with a single thirty second time interval. The position data may be processed as described below. Optional processing unit 140 may perform some processing and functions for data from sensor platform 102, may simply pass data from sensor platform 102 to server 150 or may be omitted. In addition, processing unit 140 may perform processing on data received by mobile sensor platform 102A. For example, processing unit 140 may utilize a model that incorporates external or in-cabin environmental data received by mobile sensor platform 102A from server 150 or nearby platforms 102B and/or 102C. Utilizing such a model, processing unit 140 may make determinations regarding the quality of the external or in-cabin environment of the vehicle corresponding to sensor platform 102A. Processing unit 140, or an associated memory (not shown in FIG. 1), may also include modeled data and/or other data sets. Such modeled data may be received by sensor platform 102A during use or may be preloaded, for example when mobile sensor platform 102A or the corresponding vehicle is manufactured. Further, data provided by sensor platform 102A may be utilized in modeling. In some embodiments, such data sets are located at server 150.

Mobile sensors platforms 102B and 102C are analogous to mobile sensor platform 102A. In some embodiments, mobile sensor platforms 102B and 102C have the same components as mobile sensor platform 102A. However, in other embodiments, the components may differ. For example, mobile sensor platforms 102B and/or 102C may omit in-cabin sensor(s) 160 or may only include in-cabin sensor(s) and not include remaining sensors 110, 120 and 130 for sensing data external to the vehicle. However, mobile sensor platforms 102A, 102B and 102C function in an analogous manner. Mobile sensor platforms 102 send data to server 150, for example for additional processing. In some embodiments, mobile sensor platforms 102 exchange data. For example, mobile sensor platform 102B may send external environmental data directly to mobile sensor platform 102A for use by mobile sensor platform 102A in determining the external environmental quality.

Server 150 includes sensor data database 152, processor(s) 154, memory 156 and position data database 158. In some embodiments, server 150 may be considered to provide cloud services. Although discussed in the context of a centralized server, multiple servers in multiple locations providing a variety of services may be used. Processor(s) 154 may include multiple cores. Processor(s) 154 may include one or more central processing units (CPUs), one or more graphical processing units (GPUs) and/or one or more other processing units. Memory 156 can include a first primary storage, typically a random access memory (RAM), and a second primary storage area, typically a non-volatile storage such as solid state drive (SSD) or hard disk drive (HDD). Memory 156 stores programming instructions and data for processes operating on processor(s) 154. Primary storage typically includes basic operating instructions, program code, data and objects used by processor(s) 154 to perform their functions. Primary storage devices (e.g., memory 156) may include any suitable computer-readable storage media, described below, depending on whether, for example, data access needs to be bi-directional or uni-directional Sensor data database 152 includes data received from mobile sensor platforms 102. Sensor data database 152 may also include environmental data from in-cabin sensor(s) 160. After capture by mobile sensor platforms 102, external data captured by sensors 110, 120 and 130 and in-cabin environmental data captured by in-cabin sensor(s) 160 stored in sensor data database 152 may be operated on by various analytics. Position data database 158 stores position data received from mobile sensor platforms 102. In some embodiments, sensor data database 152 stores position data as well as sensor data. In such embodiments, position data database 158 may be omitted. Server 150 may include other databases and/or store and utilize other data. For example, server 150 may include calibration data (not shown) used in calibrating sensors 110, 120 and 130. Server 150 may also include data from other sources, such external environmental data from the Environmental Protection Agency that is captured by other stationary sensing platforms (not shown in FIG. 1), in-cabin environmental data from other sources such as vehicle manufacturers, and/or modeled data (e.g. air quality data models and traffic pattern models that may be a proxy for vehicle emissions). Server 150 may also include models provided via machine learning or other tools and used to provide recommendations or make decisions related to the environmental data.

System 100 may be used to capture, analyze and provide information regarding environmental data. System 100 may also be utilized to evaluate the environmental quality in and/or around vehicles, provide information regarding the environmental quality and provide mitigation actions that may be taken to alleviate issues with the environmental quality. Mobile sensor platforms 102 may be mounted on vehicles dedicated to traversing routes and obtaining external (outside of the vehicle) and in-cabin data. Mobile sensor platforms 102 may also be mounted on other vehicles, such as fleet or personal vehicles. In such a case, mobile sensor platforms 102 collect data as users of the vehicles carry out their daily activities. Consequently, a relatively small fraction of vehicles on the road may be a rich source of information on environmental quality. Data may also be frequently sent for additional processing. In some embodiments, measurements by sensors 110, 120, 130 and/or 160 may be collected at rates as high as 1 Hz with data organized, compressed and sent to server 150 in batches once per minute. Server 150 may process the sensor data and position data, provide corrections and aid in calibrating sensors. In some embodiments, server 150 receives external and in-cabin environmental data from sensor platforms 102 and stationary sensor platform(s) 103, processes the data, determines the in-cabin and external environmental quality, and provides mitigation actions, if any. In some embodiments, some or all of the data ingested may be evaluated using quality assurance and/or quality control methods that identify anomalous data at the sensor and system level. In other embodiments, some or all of these tasks may be performed at the vehicles, for example by processing unit 140. In some embodiments, some or all of these processes are performed in real time or near real time. Information related to environmental data may also be presented to the user. During deployment, the data may be frequently or substantially continuously evaluated to ensure proper operation of the network and recalibrated. Real-time alerting, filtering of erroneous data and recalibration for mobile sensor platforms 102 and/or in-cabin sensor(s) 160 may be automated. In addition, system 100 may make comparisons to any government monitoring locations in the area of interest, for example via on-the-fly data quality spot checks. In some embodiments, system 100 employs both physical and empirical means to synchronize air quality data with GPS location. Devices, such as some or all of sensor platforms 102, may be efficiently swapped with freshly calibrated nodes on an as-needed basis, using data quality indicators of field-based calibration efficacy. Thus, using system 100 environmental data may be collected and utilized based on a sparse network of mobile sensor platforms 102.

Figure 2:
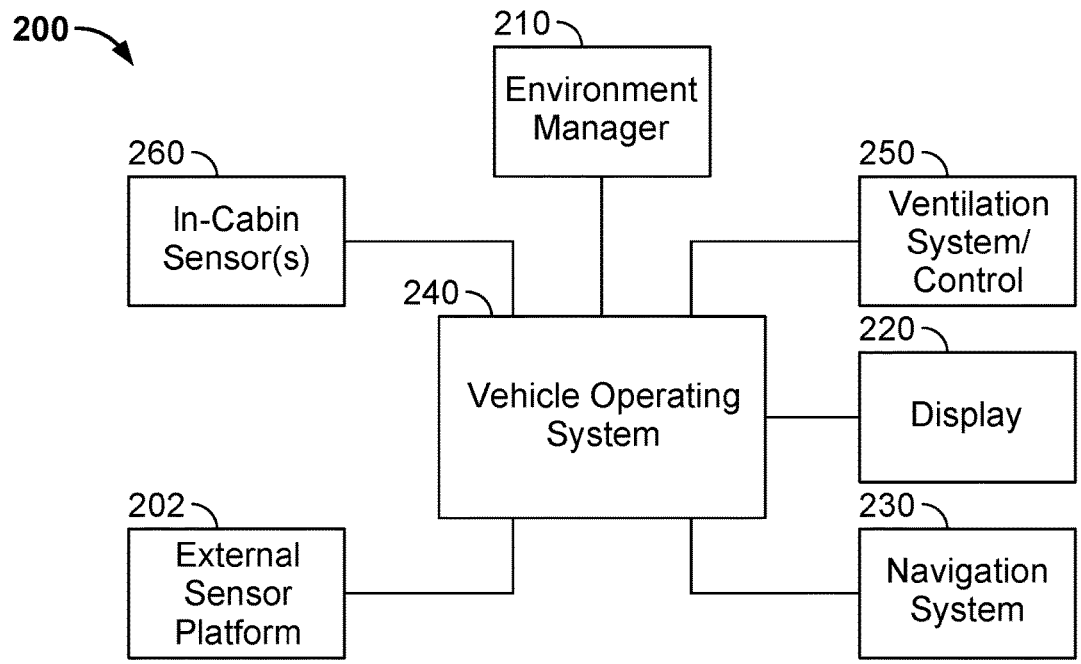
FIG. 2 depicts an embodiment of a vehicle including a system for collecting and processing environmental data.

FIG. 2 depicts an embodiment of vehicle 200 including a system for collecting and processing environmental data. For clarity, only some components are shown and some components shown may be omitted in some embodiments. Vehicle 200 includes external sensor platform 202, environment manager 210, display 220, navigation system 230, vehicle operation system (OS) 240, ventilation system 250 and in-cabin sensor(s) 260. Vehicle 200 may be part of and utilize system 100. In some embodiments, vehicle 200 may be a low or zero emission vehicle.

External sensor platform 202 includes a sensor platform analogous to sensor platforms 102. Thus, external sensor platform 202 may detect and provide at least some processing for external environmental data. External sensor platform 202 may also include a manifold or other air intake mechanism. Consequently, external sensor platform 202 may be mounted in an interior space, such as a trunk, but still access the ambient outside of vehicle 200. External sensor platform 202 may also omit in-cabin sensors. In-cabin sensor(s) 260 are analogous to in-cabin sensors 160. Thus, in-cabin sensor(s) 260 may be part of external sensor platform 202 in some embodiments. In some embodiments, however, in-cabin sensor(s) 260 may be incorporated into the vehicle. For example, such in-cabin sensor(s) 260 may be incorporated into the vehicle's ventilation system 250 by the vehicle's manufacturer. In some embodiments external sensor platform 202 may include additional in-cabin sensors separate from in-cabin sensor(s) 260. In some embodiments, a single set of sensors may be used for at least some of in-cabin sensor(s) 260 and at least some of the sensors on external sensor platform 202 if samples (e.g. air samples) may be separately taken from the cabin and outdoors and separately provided to the sensors. In some embodiments, in-cabin sensors are omitted. External and/or in-cabin environmental data may be sent to a server, such as server 150, or other entity via external sensor platform 202 and/or environment manager 210.

Environment manager 210 may be utilized to measure, send data, receive data and/or control aspects of the in-cabin environment of vehicle 200. For example, environment manager 210 may include or manage a subscription service. Thus, a single entity providing the subscription service may manage some or all aspects of data storage, synthesis, access/security, and analysis. Subscriptions may be purchased directly by vehicle and fleet owners, could be offered by automotive manufacturers in new vehicles or provided in another manner. Such subscription services might be linked to other automotive computing and networking services. Such a service may also be used to send environmental data from vehicle 200, for example to a server such as server 150 or another vehicle having a subscription service. Data from vehicle 200 may be anonymized and streamed. Such data may be used for integration into high-resolution mapping of local conditions and/or for other purposes. The subscription service may be used to receive external and/or in-cabin environmental data from other sources separate from vehicle 200. Further, calibration data and/or information used by external sensor platform 202 may be provided via environment manager 210. Environment manager 210 may also utilize the processing unit (not shown in FIG. 2) for external sensor platform 202 and/or the processor(s) running vehicle operating system 240 to perform various functions described herein. For example, environment manager 210 may perform some or all of processing of in-cabin and/or external environmental data from in-cabin sensor(s) 260 and external sensor platform 202; may send data to or receive data from server(s) analogous to server 150; may send data to or receive data from other authorized vehicles; may evaluate data to determine the in-cabin and/or external environmental quality in and around vehicle 200 and/or may provide mitigation actions via display 220 and/or ventilation system 250.

Ventilation system 250 includes any manifolds or physical mechanisms used to control the environment of the cabin of vehicle 200. For example, ventilation system 250 may include air vents, filters, air recirculation systems, air conditioning systems, heating systems, and windows. Ventilation system 250 also includes control mechanism(s). For example, ventilation system 250 may include electronics or other mechanisms to open and close air vents, engage air recirculation systems, and/or open and close windows. Thus, in some embodiments, environment manager 210 may utilize ventilation system 250 to perform actions such as opening window(s) and air vents to ventilate the cabin of vehicle 200.

Display 220 provide a visual and, in some embodiments, auditory information to a user(s) of vehicle 200. For example, display 220 may work in conjunction with navigation system 230 to display a map of the region in which vehicle 200 is traveling. Environment manager 210 may also utilize display 220 to provide information to the user(s) of vehicle 200. For example, environment manager 210 may display a warning regarding high in-cabin $CO_2$ levels and a directive to ventilate the cabin on display 220. Similarly, environment manager 210 may indicate regions and/or roads having high levels of pollution, such as $NO_2$ or PM, on a map depicted on display 220. In some embodiments, a simple display, such as an LED may be energized in order to indicate that vehicle 220 should be ventilated. For example, a green LED may indicate that $CO_2$ levels are acceptable, while a red LED may indicate that $CO_2$ levels are higher than a particular threshold and the cabin should be ventilated. In combination with navigation system 230, environment manager 210 may indicate on display 220 alternate routes to avoid or mitigate high levels of pollution.

Navigation system 230 may determine the location of vehicle 210, provide route information, provide directions and, in some embodiments, operate vehicle 200. Navigation system 230 may utilize display 220 to provide information to user(s) of vehicle 200. Navigation system 230 may also allow for self-driving by vehicle 200. In addition, navigation system 230 may operate in conjunction with environment manager 210. For example, navigation system 230 may perform self-driving of vehicle 200 to avoid regions of high pollution.

Thus, vehicle 200 may be capable of providing and utilizing external and/or in-cabin environmental data. Vehicle 200 may provide information regarding and allow mitigation of ambient conditions in and around vehicle 200. Vehicle 200 may use external sensor platform 202 to contribute to the mapping of conditions due to other vehicles on the same roadway and/or stationary sources of pollution (e.g. large industrial facilities). Data sensed by external sensor platform 202 and/or in-cabin sensor(s) 260 may also be provided to other vehicles for use in managing the in-cabin environment for their occupants. Vehicle 200 may also provide mitigation actions (e.g. ventilating the vehicle or engaging air recirculation) for its occupants based on data collected by external sensor platform 202 and/or in-cabin sensor(s) 260 as well as data from external sources provided via environment manager 210. In some embodiments, vehicle 200 may omit external sensor platform 202 and/or in-cabin sensors 260. In such embodiments, vehicle 200 may still receive external and in-cabin environmental data from external sources via environment manager 210. Thus, vehicle 200 may still be capable of providing mitigation actions for occupant(s) of vehicle 200. For example, vehicle 200 may utilize display 220 to notify occupants of upcoming regions that are high in pollutants based on external environmental data received from external sources (e.g. other vehicles in the region, other vehicles previously traversing the region or stationary sensor platforms) via environment manager 210. Similarly, vehicle 200 may utilize ventilation system 250 to periodically ventilate the cabin based on in-cabin environmental data received from external sources (e.g. similar vehicles having components that outgas in an analogous manner) via environment manager 210. Vehicle 200 may also calibrate sensors on sensor platform 202 and in-cabin sensor(s) using data provided via environment manager. This allows a higher level of confidence in the data provided and used by vehicle 200. Thus, individuals may be better able to understand and manage their exposure to pollution. Further, vehicle 200 may be one of a number of similar vehicles that are capable of providing external and/or in-cabin environmental data. Such vehicles may be dedicated to obtaining environmental data or may obtain the environmental data as the vehicles' users perform their daily activities. As a result, the amount and reliability of available environmental data may be greatly increased. Although the fraction of vehicles capable of providing environmental data may be small in comparison to the number of vehicles on the roadway, the information provided may be widely used and reliable.

Figure 3:
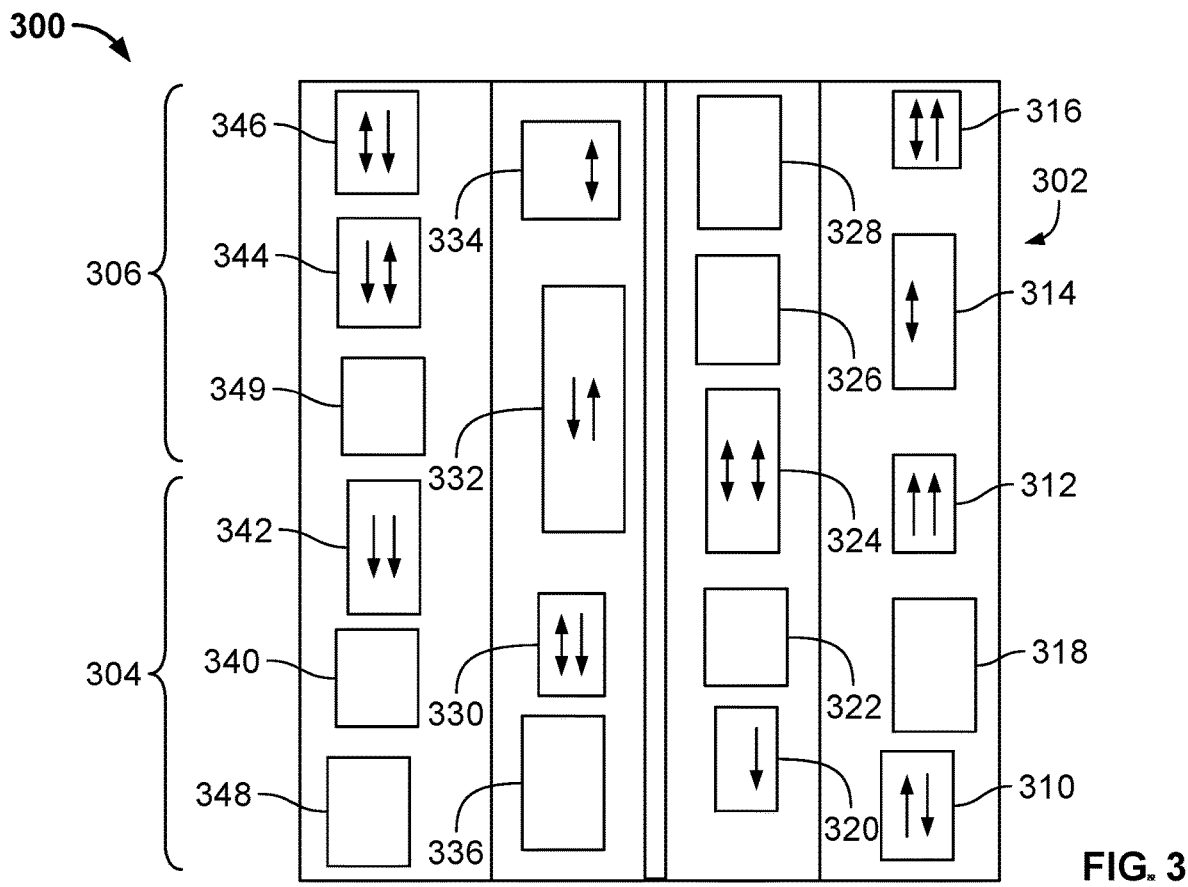
FIG. 3 is a diagram depicting an exemplary embodiment of systems for collecting and utilizing environmental data deployed in vehicles.

FIG. 3 is a diagram 300 depicting an exemplary embodiment of systems for collecting and utilizing environmental data deployed in vehicles. Diagram 300 is for explanatory purposes only and not intended to depict actual systems. Diagram 300 includes roadway 302 having four lanes of traffic. Vehicles 310, 312, 314 and 316 travel in a first lane. Vehicles 320, 322, 324, 326 and 328 travel in a second lane. Vehicles 330, 332, 334 and 336 travel in a third lane. Vehicles 340, 342, 344, 346, 348 and 349 travel in a fourth lane. Further, arrows depict the direction of in-cabin and external environmental data transmission from each vehicle. The left arrow indicates the transmission of external environmental data, while the right arrow indicates the transmission of in-cabin environmental data. A vehicle without arrows does not receive or transmit environmental data. Thus, vehicles 318, 322, 326, 328, 336, 340, 348 and 349 do not send or receive data. Vehicle 310 senses and transmits external environmental data (e.g. from an external sensor platform such as platforms 102 and 202), but only receives in-cabin data. Thus, vehicle 310 may not include any in-cabin sensors but may still utilize in-cabin environmental data in managing its environment. Vehicle 314 sends and receives external environmental data but neither sends nor receives any in-cabin environmental data. Thus, vehicle 314 might not subscribe to a data service that provides in-cabin environmental data from other sources. Vehicle 314 may also lack in-cabin sensors. In contrast, vehicle 324 sends and receives both external environmental data and in-cabin environmental data. Vehicle 324 includes both sensor platform 102/202 and in-cabin sensor(s) 160/260. Vehicle 342 only receives external and in-cabin environmental data. Vehicle 342 may not include any external or in-cabin sensors. Thus, various configurations of sensors and subscriptions are possible. Further, although a particular fraction of vehicles in diagram 300 senses and, therefore, transmits external and/or in-cabin environmental data, another fraction of vehicles may do so in other embodiments.

Roadway 302 is also shown as divided into segments 304 and 306. In the embodiment shown, segments 304 and 306 are shown as having different lengths. In other embodiments, some or all of the segments into which a road is divided might have the same length. Although only roadway 302 is shown as divided into segments, in some embodiments regions, such as city blocks, individual addresses or other geographic sections may be identified in an analogous matter. Segments 304 and 306 may be identified based on environmental data, such as data provided by vehicles currently and/or previously traveling on roadway 302. In some embodiments, segments 304 and 306 are assigned a particular pollution or environmental quality value. The environmental quality value, length and other characteristics of road segments 304 and 306 may be based upon external environmental data collected from vehicles currently or previously traveling roadway 302, location data such as GPS data from vehicles currently or previously traveling roadway 302, stationary sensor platform(s) (not shown) in the area traffic data and/or other information. Information related to segments 304 and 306 may be provided to vehicles via the subscription service described above. For example, vehicle 332 may obtain environmental quality information related to road segments 304 and 306 via a subscription despite not providing external environmental data to the service or other vehicles. If road segment 306 is assigned a poor external environmental quality, while road segment 304 has acceptable external environmental quality, then as vehicle 332 transitions to segment 306, vehicle 332 may be provided with an appropriate mitigation action, such as engaging air recirculation for its ventilation system.

As indicated in diagram 300, data received from a small fraction of vehicles may be used to monitor the environments for a larger number of vehicles. Further, information from these vehicles can be used to provide mitigation for a larger number of vehicles. Not all vehicles need to include monitoring systems. Instead, a relatively small number of measurement platforms on a relatively small number of vehicles can be received and used to inform a large number of nearby vehicles. Vehicles used may be private vehicles (e.g. passenger vehicles), vehicles owned by a single entity (e.g. a fleet of vehicles), or other transport mechanisms capable of carrying the sensor platform 102/202 and/or in-cabin sensor(s) 160/260. The effects of ambient conditions, both external and internal to vehicles, on in-cabin air quality may be determined. Mapping of external environmental data may provide further expansion and depth of coverage of on-road air quality. Data received from sensing platforms 102 and/or 202 from multiple vehicles, such as shown on road 302 may provide distributed measurement. Further, the cost of a system of providing environmental data to vehicles may be spread among a larger number of users.

Figure 4:
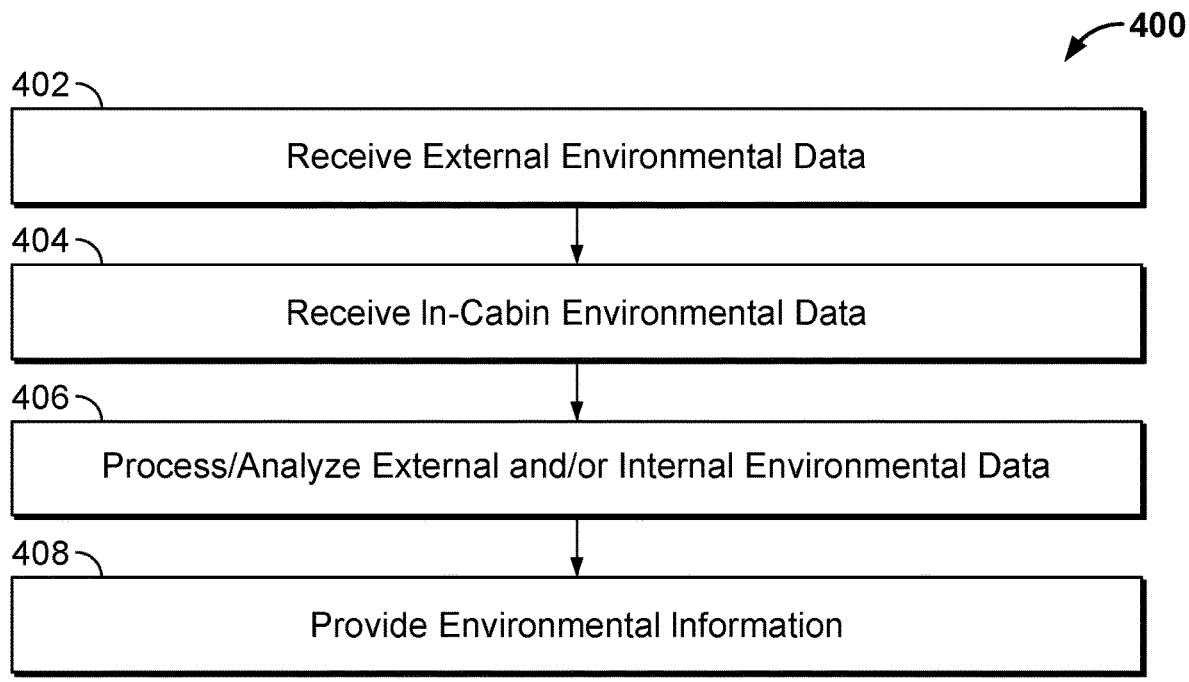
FIG. 4 is a flow chart depicting an exemplary embodiment of a method for collecting and processing environmental data.

FIG. 4 is a flow chart depicting an exemplary embodiment of method 400 for collecting and processing environmental data. Method 400 may use mobile sensor platforms, such as mobile sensor platforms 102 and vehicle 200. For example, some of method 400 may be performed at vehicle 200 and/or vehicles in diagram 400, while some of method may be performed at server 150. Similarly, all of method 400 may be performed at vehicle 200 or all of method 400 may be performed by server 150. Method 400 is described in the context of system 100 and vehicle 200, but may be performed using other systems. For clarity, only some portions of method 400 are shown. Although shown in a sequence, in some embodiments, processes may occur in parallel and/or in a different order.

External environmental data is received, at 402. The external environmental data received may include sensor data from one or more vehicles, mobile sensor platforms and/or stationary sensor platforms. For example, sensor data from mobile sensor platforms 102 or external sensor platform 202 may be received at server 150, processing unit 140 or environment manager 210. In-cabin environmental data is received, at 404. The in-cabin environmental data may include sensor data received from one or more vehicles. This in-cabin environmental data may be received at processing unit 140, server 150, or environment manager 210.

The environmental data (e.g. in-cabin and external environmental data) is processed and analyzed, at 406. In some embodiments, machine learning, computational intelligence and/or other data processing tools may be used. As part of processing, sensor data may be calibrated to account for drift or the temperature of the sensor at 406. The specific levels of particular pollutants or contaminants are also determined at 406. For example, the parts per million of a specific size of PM may be determined at 406. In some embodiments, the corresponding environmental quality is also determined at 406. For example, the levels of particular pollutants or contaminants may be compared to one or more standards to determine whether the levels meet or exceed the thresholds. In some embodiments, a characterization of the environment is also determined. For example, if the $NO_2$ level exceeds a particular threshold, the environmental quality may be deemed "poor". If the $NO_2$ level is between certain thresholds, the environmental quality may be deemed "moderate". If the $NO_2$ level is below a threshold, the environmental quality may be considered "good". The environmental data is provided, at 408. For example, the levels of particular contaminates in the environmental data may be displayed, the environmental quality may be displayed and/or the levels or quality of regions may be mapped. The environmental data may also be provided to vehicles, such as vehicle 200, for use in determining mitigation actions. In some embodiments, mitigation actions may be determined at a server 150 and provided to vehicles such as vehicle 200 for use. In some embodiments, some or all of this information may be provided in real time or with minimal delay.

Using method 400, data received from a small number of measurement platforms on a relatively small number of vehicles can be received at 402 and used to inform a large number of nearby vehicles. The effects of ambient conditions, both external and internal to vehicles, on in-cabin air quality may be determined. Mapping of external environmental data may provide further expansion and depth of coverage of on-road air quality. Near real time predictions and/or information may be provided. Thus, mitigation actions (e.g., turning on air recirculation and filtration) may also be provided in near real time.

Figure 5:
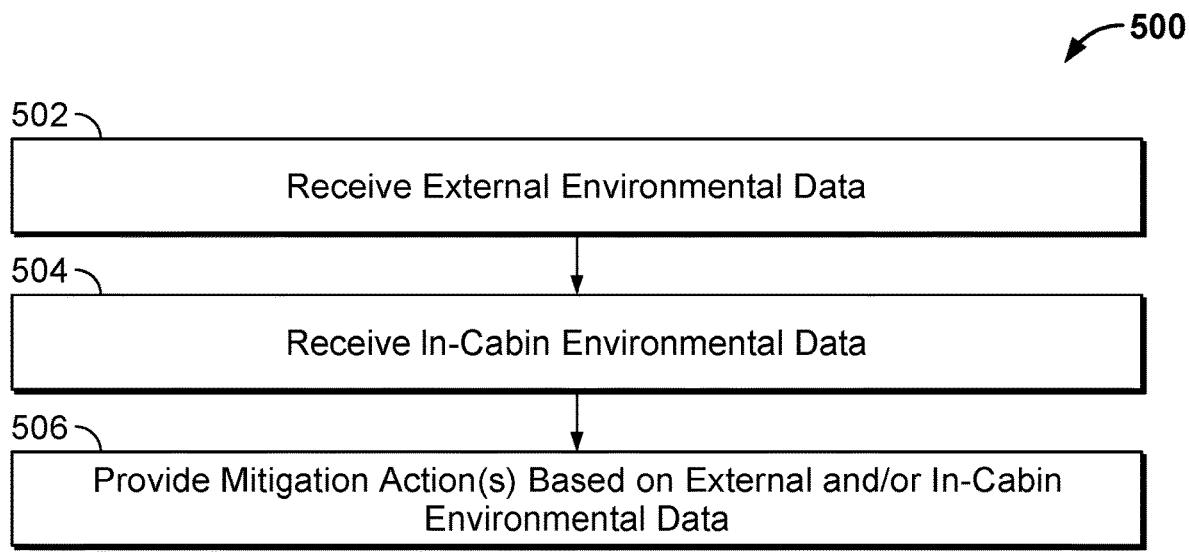
FIG. 5 is a flow chart depicting an exemplary embodiment of a method for utilizing environmental data.

FIG. 5 is a flow chart depicting an exemplary embodiment of method 500 for utilizing environmental data. Method 500 may use mobile sensor platforms, such as mobile sensor platforms 102/202 and vehicle 200. For example, some of method 500 may be performed at vehicle 200, while some of method may be performed at server 150. Similarly, all of method 500 may be performed at vehicle 200 or all of method 500 may be performed by server 150. Method 500 is described in the context of system 100 and vehicle 200, but may be performed using other systems. For clarity, only some portions of method 500 are shown. Although shown in a sequence, in some embodiments, processes may occur in parallel and/or in a different order. Method 500 is also described in the context of a particular vehicle, but can be generalized to multiple vehicles.

External environmental data is received, at 502. The external environmental data relates to the environment outside of the vehicle. External environmental data may include detection and measurement of pollutants or contaminants such as $NO_2$, CO, NO, $O_3$, $SO_2$, $CO_2$, $CH_4$, VOCs, radiation and particulate matter outside of a vehicle. External environmental data may be processed or may be raw sensor data. The external environmental data may be received from sensors on the vehicle (e.g. on sensor platform 102/202) or from other, external sources. For example, other vehicles in the same area may be an external source. In some embodiments, to be an external source, the other vehicles must be within a particular distance at substantially the same time, such as one hundred feet. In other embodiments, other distances may be used. The distance used may also vary depending upon the speed of the vehicle. For example, the faster the vehicle travels, the larger the distance used may be. Other times may be used if the data is deemed reliable. For example, external environmental data from another vehicle from a previous day may be received at 502. Other external sources may include nearby stationary sensor platforms and/or other data sets. For example, the modeled air quality data, data from the Environmental Protection Agency or other data models may also be sources of external environmental data received at 502. In some embodiments, receiving external environmental data at 502 may include receiving data from other sensors and/or other information and using the information and/or data to infer aspects of the external environmental data at 502.

In-cabin environmental data is received, at 504. The in-cabin environmental data relates to the environment within the passenger compartment of the vehicle. In-cabin environmental data may include the same and/or additional pollutants or contaminants measured within the cabin of the vehicle. Sources of such contaminants may include the driver and passengers (e.g. $CO_2$ from exhaling, hydrocarbons from cigarettes smoke), the vehicle (e.g. compounds outgassing from surfaces of the vehicle such as the dashboard) and external pollutants (e.g. pollutants that enter through the vehicle's ventilation system). Of particular interest may be $CO_2$ and VOCs. In-cabin environmental data may be processed or may be raw sensor data. The in-cabin environmental data may be received from sensors on the vehicle (e.g. on in-cabin sensor(s) 160/260) or from other, external sources. For example, other vehicles in the same area may be an external source. In some embodiments, the external sources may be restricted to vehicles having a similar make and/or model as the vehicle for which method 500 is performed. Similar distance and timing constraints may apply as for external environmental data. Other external sources of in-cabin environmental data may include the manufacturer of the vehicle or other entity that has tested the interior of the vehicle (or a similar vehicle) for outgassing and/or other contributors to the in-cabin environment. Although in-cabin environmental data relates to the conditions within the cabin of the vehicle, the external environment surrounding the vehicle affects the in-cabin environment, for example through an open ventilation system. In some embodiments, receiving in-cabin data at 504 may include receiving other information and inferring in-cabin environmental data. Such data may include external environmental data and/or from additional sensors in the vehicle. For example, seat occupancy information and ventilation history (e.g. how long has the vehicle been on without being ventilated) could be utilized to determine inferred in-cabin $CO_2$ and TVOC (total volatile organic compound) levels. The number of occupants may be determined from data received relating to the number of seatbelts engaged or from the number of airbag sensors that indicate the presence of an occupant in a seat. The average amount of $CO_2$ an individual exhales per unit time multiplied by number of occupants and multiplied by the time since the vehicle has been ventilated can be used to calculate an inferred CO2 level. Similarly, the TVOC level per unit time for the cabin multiplied by the time since the vehicle has been ventilated can be used to calculate an inferred TVOC level. Such inferences may be used in the absence of in-cabin sensors or in conjunction with other information received at 502.

One or more mitigation actions are provided based on the in-cabin and external environmental data, at 506. A mitigation action is utilized to address an issue with the in-cabin environment. Providing the mitigation action may include providing information (e.g. providing a map highlighting areas with high pollution), providing a recommendation for a mitigation action (e.g. requesting that the vehicle be ventilated, displaying different route(s), and/or providing directions for the new route) and/or carrying out a mitigation action (automatically turning on air recirculation, automatically engaging a filter, automatically rolling down windows, or automatically driving to the new route). The mitigation action may be immediate or may be prospective. For example, an immediate mitigation action may be rolling down windows to ventilate the vehicle. A prospective mitigation action may include a recommendation to replace air filters or other action taken before travel in the vehicle is undertaken. If the mitigation action is automatically performed as part of 506, a feedback loop may be utilized to continue to adjust the in-cabin environment. For example, if the vehicle is automatically ventilated, a feedback loop may take derivatives of various contaminants sensed to control ventilation based on changes to the quantities of contaminants and the attendant changes in environmental quality.

In order to provide the mitigation action at 506, the environmental data (e.g. in-cabin and external environmental data) is processed and analyzed. In some embodiments, some or all of this processing occurs at the vehicle, using processing units on a mobile sensor platform or embedded in the vehicle. In some embodiments, some or all of the processing may occur elsewhere, using a server and/or other cloud services. In some embodiments, the external and/or in-cabin environmental qualities are determined at 506. Also at 506, the external and/or in-cabin environmental qualities may be compared to standards. In some embodiments, the external and in-cabin environmental qualities are compared in order to provide the mitigation action at 506. For example, the $CO_2$ levels within the cabin may be determined and compared standards for $CO_2$ levels known to decrease driver cognition. If $CO_2$ levels within the cabin exceed these levels, then the $CO_2$ levels inside the cabin and outside of the cabin may be compared to determine whether ventilating the cabin would improve the in-cabin environmental quality. If the external $CO_2$ levels are lower than the in-cabin $CO_2$ levels, then the mitigation action of ventilating the cabin is provided. In some embodiments, standards are not utilized and the external environmental quality is simply compared to the in-cabin environmental quality to determine the mitigation action provided. In some embodiments, other conditions, such as the level of PM or VOCs may also be used. For example, although $CO_2$ levels may indicate it would be desirable to ventilate the cabin, PM levels in the external environmental data may indicate it is unsafe to do so. In such a case, the mitigation action provided may be to keep the air recirculation system engaged or to select another route. In some embodiments, determination of the in-cabin and external environmental qualities may include processing data from different sources (e.g. sensors located on the vehicle and data from external sources) and weighting the data. For example, environmental data from sensors on the vehicle may be given a higher weight than data from other vehicles or other data sets. In some embodiments, the mitigation action is provided in real time or near real time.

For example, vehicle 200 may receive external environmental data, such as $CO_2$ sensed, from external sensor platform 202, at 502. Also at 502, vehicle 200 may receive data from one or more surrounding vehicles or stationary sensor platforms via environment manager 210. At 504, vehicle 200 may receive in-cabin environmental data, such as $CO_2$ sensed, from in-cabin sensor(s) 260. Also at 504, vehicle 200 may receive expected $CO_2$ levels based on the make and model of vehicle 200 via environment manager 210. In some embodiments, vehicle 200 processes the environmental data from sensor platform 202 and in-cabin sensor(s) 260 to determine measured $CO_2$ levels outside and inside vehicle 200. In some embodiments, vehicle 200 provides the environmental data form sensor platform 202 and in-cabin sensor(s) 260 to another service, such as server 150. This service may determine measured $CO_2$ levels outside and inside vehicle 200. The service may also transmit these measured $CO_2$ levels back to vehicle 200. At 506, a mitigation action is provided. For example, suppose measured $CO_2$ levels within the cabin of vehicle 200 are high compared to a particular standard, while measured $CO_2$ levels outside of vehicle 200 are low compared to the standard or to the levels within the cabin. These measurements may have been confirmed using the external environmental data sources (e.g. other vehicles and data set indicating expected $CO_2$ levels for vehicle 200). It is determined at 506 that vehicle 200 should be ventilated. In some embodiments, this determination is made via processing unit 140 or the processor(s) of vehicle 200. In some embodiments, this determination is made elsewhere, such as server 150, and provided to vehicle 200 via environment manager 250. At 506, this ventilation instruction may be provided to users via display 220 or may automatically be performed using ventilation system 250.

In another example, a vehicle that does not have external sensors may still be capable of managing the in-cabin air quality. At 502, for example, no external environmental data may be received. At 504, in-cabin environmental data indicating high $CO_2$ levels may be received (or inferred from other information). At 506 a mitigation action such as ventilating the vehicle may be provided. Thus, an intervention (manual or automatic) may be provided. If subsequent data shows worsening air quality (due to $CO_2$ and/or another pollutant), the intervention could be reversed. For example, if a feedback loop is employed and the mitigation automatically carried out, the recirculation could be automatically shut off (ventilating the cabin) to reduce $CO_2$ levels and then re-engaged in response to an increase in another pollutant. It could be valuable to let in some polluted air to reduce $CO_2$ levels and then to quickly resume recirculation. Depending on the sensor payload for the vehicle, this procedure could be done in the absence of information about external environment.

In some embodiments, a vehicle that does not have in-cabin sensors may still be capable of managing the in-cabin air quality. At 502, external environmental data indicating extremely high PM levels may be received (or inferred from other information). At 504 no in-cabin environmental data may be received. At 506 a mitigation action such as turning on recirculation in the vehicle and/or closing windows may be provided. Thus, an intervention (manual or automatic) may be provided. If subsequent data shows an improvement air quality (e.g. a reduction in PM outside the vehicle), the intervention could be completely or partially reversed. For example, if a feedback loop is employed and the mitigation automatically carried out, the recirculation could be automatically turned on to reduce PM levels and then shut off (ventilating the cabin) in response to the decrease in the pollutant. This may be accomplished in the absence of external environmental sensors.

In another example, at 502, vehicle 200 may receive external environmental data from sensor platform 202 detecting high CO levels. At 504, in-cabin environmental data indicating high CO levels may be received from in-cabin sensors 260. If moving, the mitigation action provided at 506 may be an in-cabin alarm to notify occupants of vehicle 200. If vehicle 200 is stationary, then the mitigation action provided at 506 may be an engine shut off that occurs automatically or in response to a user's direction.

In some embodiments, method 500 may be utilized in the context of stationary structures (e.g. buildings). In such embodiments, in-cabin environmental data may be received from one or more sections within the structure. The mitigation action may then be provided for particular sections of the structure. Further, different mitigation actions might be provided for different sections of the building. For example, a closed, unventilated room with a large number of occupants may have high level of $CO_2$, while a second room of the building may have a high level of PM. Using method 500, at 502, external data received from vehicles, stationary external environmental sensors on the building, the subscription service, other stationary sensor platforms, data sets, models or other sources may indicate low levels of $CO_2$ and high or moderate levels of PM outside of the building. The in-cabin data received at 504 indicates high $CO_2$ levels in the first room and high levels of PM in the second room. At 506, a mitigation action may be provided. In some embodiments, only external data from nearby structures or vehicles is used. However, datasets or models for the interior of the structure may be employed. The mitigation action provided at 506 may include ventilating (e.g. opening windows or turning off air recirculation) for the first room and sealing (e.g. closing windows or turning on air recirculation) for the second room. In some embodiments, the first room may be ventilated for only a short time to prevent excessive PM levels in the first room. Thus, data from vehicles and/or subscription services may be utilized via method 500 for stationary structures. In some embodiments, other aspects of the mechanisms described herein may be utilized in the context of stationary structures.

Using method 500, occupants of vehicles exposure to poor environmental quality and/or environmental hazards may be mitigated. Further, using method 500, a server such as server 150 may be provided with measured data from the vehicles. Thus, data measured by a particular vehicle may be used by other vehicles.

Figure 6:
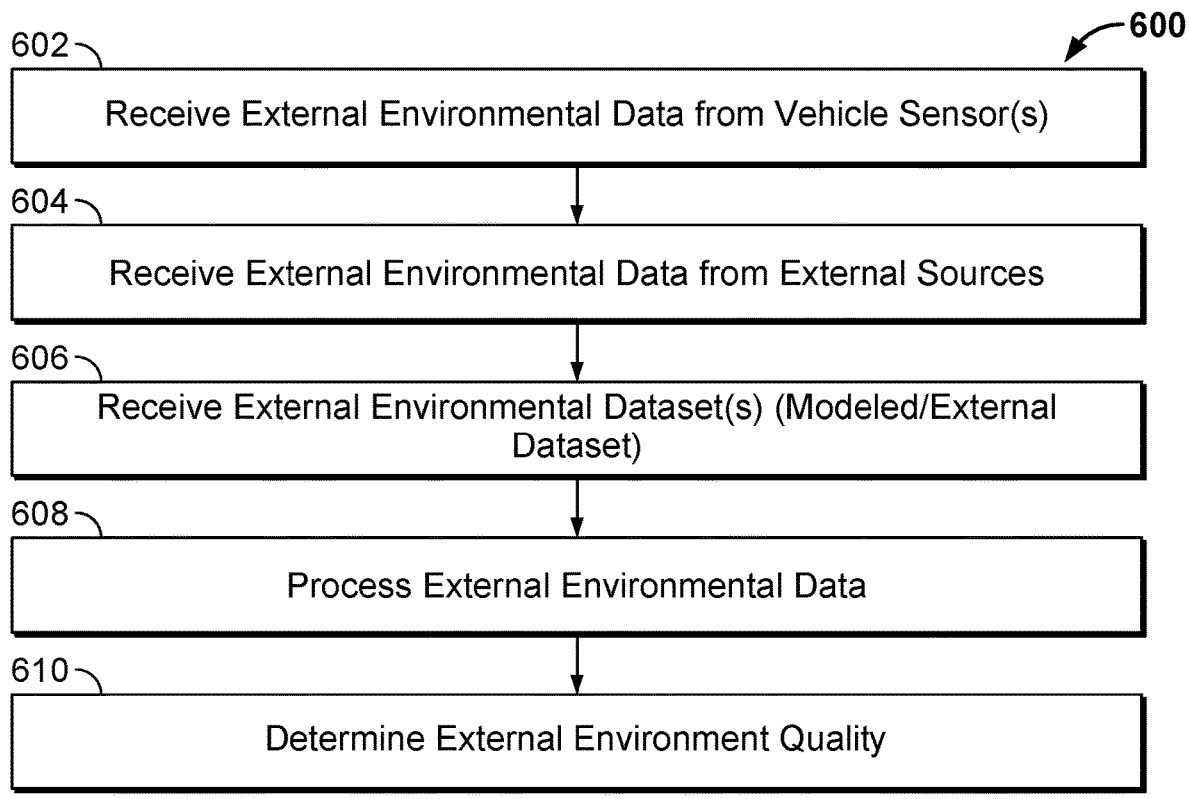
FIG. 6 is a flow chart depicting an exemplary embodiment of a method for utilizing external environmental data.

FIG. 6 is a flow chart depicting an exemplary embodiment of method 600 for utilizing external environmental data. Method 600 may use mobile sensor platforms, such as mobile sensor platforms 102/202 and vehicle 200. For example, some of method 600 may be performed at vehicle 200, while some of method may be performed at server 150. Similarly, all of method 600 may be performed at vehicle 200 or all of method 600 may be performed by server 150. Method 600 is described in the context of system 100 and vehicle 200, but may be performed using other systems. For clarity, only some portions of method 600 are shown. Although shown in a sequence, in some embodiments, processes may occur in parallel and/or in a different order. Method 600 is also described in the context of a particular vehicle, but can be generalized to multiple vehicles.

External environmental data is received from sensor(s) on the vehicle, at 602. Thus, 602 is performed for vehicles for which sensors, such as those on sensor platforms 102 and 202, are present. In some embodiments, 602 may be omitted, for example if the external environmental data sensors are not present on the vehicle.

External environmental data is received from external sources, at 604. For example, external environmental data from sensor platforms such as platforms 102/202 on other vehicles, stationary sensor stations such as station 103, or other monitoring systems for external environmental data are received. In some embodiments in which data from external sources is not used, 604 may be omitted.

Modeled external environmental data is received for use, at 606. In some embodiments, 606 may be omitted. For example, data from air quality models, a data set from the Environmental Protection Agency, traffic data used as a proxy for vehicle emission data or other data sets. In some embodiments, 606 may be performed at different times. For example, when data sets are loaded to a memory for a server, or vehicle or sensor platform. Thus, at 602, 604 and/or 606 external environmental data may be received in various forms. In some embodiments, 602, 604 and/or 606 are analogous to 402 or 502 of method 400 or 500.

The external environmental data received at 602, 604 and/or 606 is processed at 608. In some embodiments, 608 may include calibrating, storing and otherwise converting signals from sensors into usable environmental data. In some embodiments, at least part of 608 is performed by a processing unit on a mobile sensor platform and/or processors that are part of the vehicle. In some embodiments, at least part of 608 is performed by a server or other analogous system. For example, limited processing of signals, comparisons of these signals to predetermined thresholds and inputting of data to models may occur on a mobile sensor platform such as platform 102 and 202. Additional processing, decision making and/or other actions may occur at a server, such as server 102/202. For example, data may be weighted based upon a location of the external source of the sensor data (e.g. the distance to the corresponding vehicle or stationary sensor platform), an age of a sensor corresponding to the external environmental data, an expected lifetime of the sensor, an interval since a last calibration of the sensor, vehicle speed, a number of vehicles within the particular distance providing the external environmental data, reliability of the modeled data, and/or other factors.

Based on the external data, the external environmental quality for the corresponding vehicle is determined, at 610. For example, external environmental data from sensors and/or models may be compared to standards, to modeled data and/or to measurements taken by other vehicles or sensor platforms. In some embodiments, modeled data or other data sets may be used in addition to or in lieu of sensor data to determine external environmental quality. For example, if a vehicle is unable to communicate with a server for processing of the data or processing is sufficiently delayed for some reason, the vehicle may use a stored data set of external environmental data for the region to evaluate the external environmental quality. This external environmental quality may be used to determine whether to provide a mitigation action, to provide information to users or other individuals and/or for other purposes. Thus, monitoring and mitigating of hazards such as air pollution may be improved.

Figure 7:
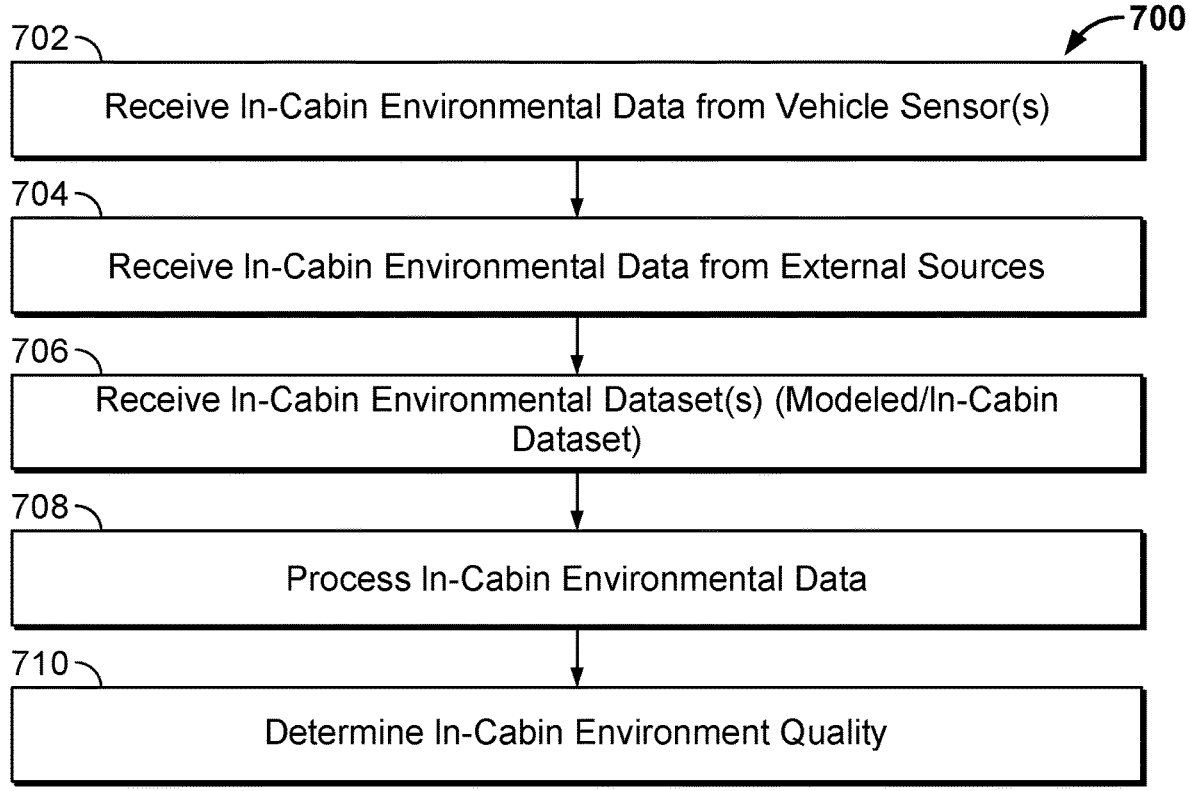
FIG. 7 is a flow chart depicting an exemplary embodiment of a method for utilizing in-cabin environmental data.

FIG. 7 is a flow chart depicting an exemplary embodiment of method for utilizing in-cabin environmental data. Method 700 may use in-cabin sensors, such as in-cabin sensor 160 on mobile sensor platforms 102, other in-cabin sensors 260 and/or other mechanisms for obtaining sensor data for the environment within the cabin of a vehicle. Some of method 700 may be performed at vehicle 200, while some of method may be performed at server 150. Similarly, all of method 700 may be performed at vehicle 200 or all of method 700 may be performed by server 150. Method 700 is described in the context of system 100 and vehicle 200, but may be performed using other systems. For clarity, only some portions of method 700 are shown. Although shown in a sequence, in some embodiments, processes may occur in parallel and/or in a different order. Method 700 is also described in the context of a particular vehicle, but can be generalized to multiple vehicles.

In-cabin environmental data is received from sensor(s) on the vehicle, at 702. Thus, 702 is performed for vehicles for which sensors, such in-cabin sensors 160 and/or 260, are present. In some embodiments, 702 may be omitted, for example if the external environmental data sensors are not present on the vehicle.

In-cabin environmental data is received from external sources, at 704. For example, in-cabin environmental data from in-cabin sensors on other vehicles (e.g. sensors 160/260) or other systems for monitoring in-cabin environmental data are received. In some embodiments in which in-cabin environmental data from external sources is not used, 704 may be omitted.

Modeled in-cabin environmental data is received for use, at 706. In some embodiments, 706 may be omitted. For example, data from simulations of outgassing of cabin components and/or models of the in-cabin environment may be received. In some embodiments, 706 may be performed at different times. For example, when data sets are loaded to a memory for a server, or vehicle or sensor platform. Thus, at 702, 704 and/or 706 in-cabin environmental data may be received in various forms. In some embodiments, 702, 704 and/or 706 are analogous to 404 or 504 of method 400 or 500.

The in-cabin environmental data received at 702, 704 and/or 706 is processed at 708. In some embodiments, 708 may include calibrating, storing and otherwise converting signals from sensors into usable environmental data. In some embodiments, at least part of 708 is performed by a processing unit on a mobile sensor platform and/or processors that are part of the vehicle. In some embodiments, at least part of 708 is performed by a server or other analogous system. For example, limited processing of signals, comparisons of these signals to predetermined thresholds and inputting of data to models may occur on a mobile sensor platform such as platform 102 and 202. Additional processing, decision making and/or other actions may occur at a server, such as server 102/202. For example, data from external sources may be corrected for singularities (e.g.

smoking in the other vehicle and/or a large number of occupants in the other vehicle), data may be weighted based upon a location of the external source of the sensor data (e.g. the distance to the corresponding vehicle or stationary sensor platform), an age of a sensor corresponding to the external environmental data, an expected lifetime of the sensor, an interval since a last calibration of the sensor, vehicle speed, a number of vehicles within the particular distance providing the external environmental data, reliability of the modeled data, and/or other factors.

Based on the in-cabin data, the in-cabin environmental quality for the corresponding vehicle is determined, at 710. In some embodiments, in-cabin environmental data from sensors and/or models may be corrected for singularities as part of 708 or 710. For example, someone smoking in a vehicle that is an external source may be determined based on the types of pollutants in cigarette smoke that are detected in the external source. The levels of these pollutants may be adjusted downward when processing or using the in-cabin environmental data from the external source at 708 or 710. Other singularities may be accounted for based on other sensors in the external source. For example, the number of occupants in the other vehicle/external source or other characteristics may be desired to be accounted for in processing or using $CO_2$ detected in the external source. The number of seatbelts engaged or airbag sensors activated in the external source might be used as a proxy for the number of occupants. The time for which air circulation has been engaged in the vehicle/external source might also be used. This information may be used to adjust the values of $CO_2$ levels from the external source in determining the in-cabin environmental quality at 710 or in processing the in-cabin environmental data at 708. The in-cabin environmental data may also be compared to standards, to modeled data and/or to measurements taken by other vehicles or sensor platforms. In some embodiments, modeled data or other data sets may be used in addition to or in lieu of sensor data to determine external environmental quality. For example, if a vehicle is unable to communicate with a server for processing of the data or processing is sufficiently delayed for some reason, the vehicle may use a stored data set of external environmental data for the region to evaluate the external environmental quality. This external environmental quality may be used, for example to determine whether to provide a mitigation action, to provide information to users or other individuals and/or for other purposes. Thus, monitoring and mitigating of hazards such as air pollution may be improved.

Figure 8:
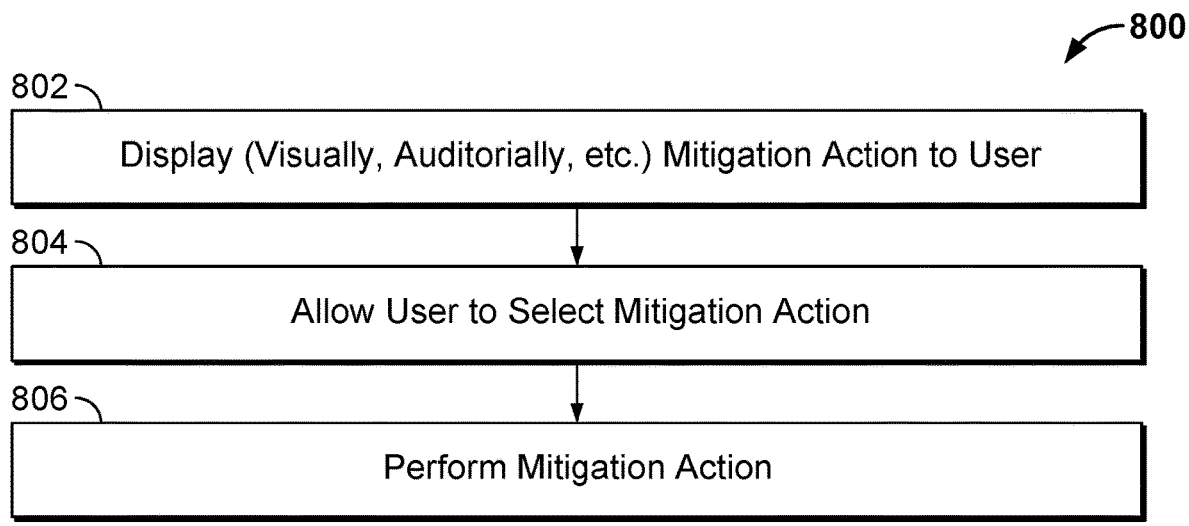
FIG. 8 is a flow chart depicting an exemplary embodiment of a method for providing a mitigation action.

FIG. 8 is a flow chart depicting an exemplary embodiment of method 800 for providing a mitigation action. Method 800 may be used with method(s) 500, 600 and/or 700. Some of method 800 may be performed at vehicle 200, while some of method may be performed at server 150. Similarly, all of method 800 may be performed at vehicle 200 or all of method 800 may be performed by server 150. Method 800 is described in the context of system 100 and vehicle 200, but may be performed using other systems. For clarity, only some portions of method 800 are shown. Although shown in a sequence, in some embodiments, processes may occur in parallel and/or in a different order. Method 800 is also described in the context of a particular vehicle, but can be generalized to multiple vehicles. In some embodiments, method 800 may be used in 506 of method 500. The mitigation action(s) determined for a particular situation, such as ventilating the vehicle or recirculating the air in a vehicle, has already been determined.

One or more mitigation actions may be displayed to a user, at 802. For example, a user may be notified of the action orally, visually or both. A user may also be allowed to select the mitigation action, at 804. If a single mitigation action is displayed at 802, then a user may simply be allowed to approve or disapprove of the mitigation action at 804. If multiple mitigation actions are displayed at 802, then the user may select from these mitigation actions or take no action. The mitigation action may then be performed, at 806. If the mitigation action is automatically performed, then in some embodiments, 802 and/or 804 may be omitted. Thus, the mitigation action may be automatically performed. The user may be notified that the action is taken. In some embodiments, 806 includes utilizing a feedback loop to adjust to changes in the cabin environment. For example, as the in-cabin environment changes, the mitigation action may be updated.

For example, it may be determined that $CO_2$ levels in a cabin are too high. At 802, options such as opening windows, turning off air recirculation and/or engaging a filter in the ventilation system may be displayed to a user on display 220. The user may select turning off air recirculation and opening the windows of vehicle 200, at 806. These mitigation actions may be automatically performed using environment manager 210 and ventilation system 250, at 806. In some embodiments, occupant(s) of the vehicles implement the mitigation action. In some embodiments, a feedback loop takes a derivative of the $CO_2$ levels. The value of the derivative indicates whether the change in $CO_2$ levels is as desired. Based on the change in $CO_2$ levels, other actions may be taken. For example, the windows may be partially or completely closed and/or air recirculation may be periodically engaged as the $CO_2$ levels are reduced.

Thus, using method 800, the mitigation actions determined to improve in-cabin air quality may be provided to the user, selected for use and implemented. Thus, the environmental quality within the cabin may be improved. Thus, users' health may be less adversely impacted.

Figure 9:
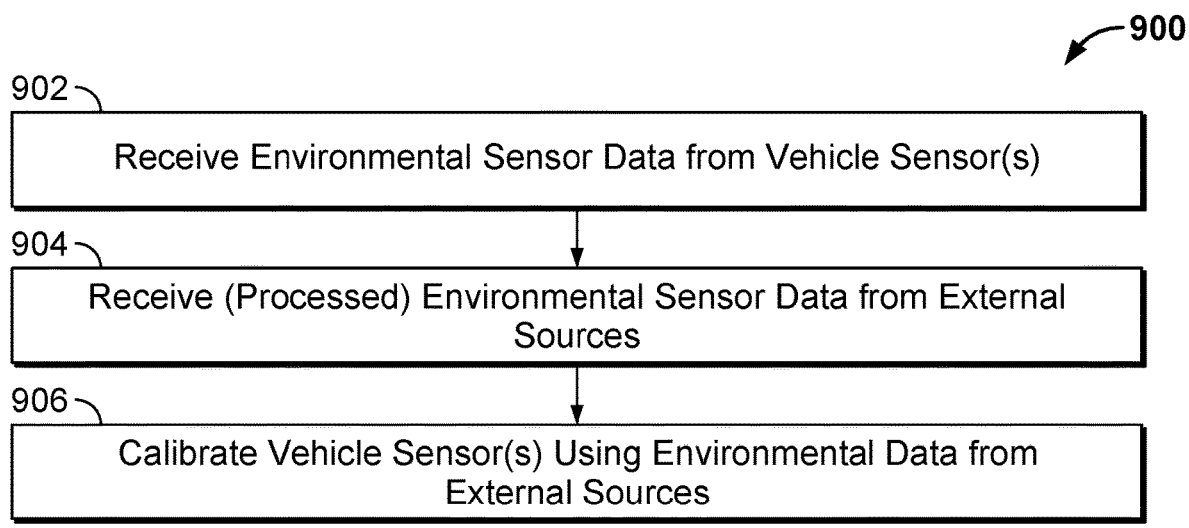
FIG. 9 is a flow chart depicting an exemplary embodiment of a method for calibrating environmental sensors.

FIG. 9 is a flow chart depicting an exemplary embodiment of method 900 for calibrating environmental sensors. Method 900 may be used with method(s) 500, 600, 700 and/or 800. Some of method 900 may be performed at vehicle 200, while some of method may be performed at server 150. Similarly, all of method 900 may be performed at vehicle 200 or all of method 800 may be performed by server 150. Method 900 is described in the context of system 100 and vehicle 200, but may be performed using other systems. For clarity, only some portions of method 900 are shown. Although shown in a sequence, in some embodiments, processes may occur in parallel and/or in a different order. Method 900 is also described in the context of a particular vehicle, but can be generalized to multiple vehicles. In some embodiments, method 900 may be used for in-cabin and/or external environmental sensors.

As vehicle sensors age, the data from the sensors may become less reliable. For example, values output by a particular sensor may drift and/or the temperature dependence of the sensor may become more pronounced. Although traditional calibration of the sensor may be utilized, additional mechanism for ensuring data quality may be desired to be employed. Thus, environmental data from other sensors on other vehicles may be used to adjust, or "calibrate" data from sensors on a vehicle using method 900.

Environmental sensor data is received, at 902. In some embodiments, 902 is analogous to 702 or 802 of methods 700 and 800, respectively. Thus, external or in-cabin data measured at the vehicle is received. Environmental data from other sources (e.g. external sources or different sensor (s) in the same vehicle) may also be received, at 904. Thus, 904 may be analogous to 604 or 704.

The sensor(s) on the vehicle are calibrated, at 906. In some embodiments, 906 includes updating data from the vehicle sensor(s) utilizing data from other (e.g. external) sources. Thus, environmental data from in-cabin sensors, other external sensor platforms on other vehicles and/or stationary sensor platforms may be used to adjust data from the sensor(s) at 906. In some embodiments, calibration data for the particular sensor are also used. As a sensor ages, data from newer sensors may be utilized to correct data from the older sensor at 906. The nature and frequency of the calibration may thus depend upon factors such as the age of the sensor, an expected lifetime of the sensor, the availability of replacements, and the ability to replace the sensor. For example, data from newer, similar sensors in nearby vehicles may be compared to environmental data from a sensor in the vehicle. The signal from the sensor in the vehicle may be adjusted to be closer to that of the other newer or more recently calibrated sensor(s) in other vehicle(s). In some cases, data from the newer, nearby sensor(s) may replace data from the sensor in the vehicle. In some embodiments, sensors may be periodically replaced.

For example, suppose in-cabin sensor(s) 260 in vehicle 200 include a $CO_2$ sensor. This $CO_2$ sensor may be difficult to access and may drift over time. Further, the $CO_2$ sensor may be expected to remain in vehicle 200 for a long period of time, such as five years or more. Although such a $CO_2$ sensor may have known calibration factors associated with it when deployed, these calibration factors may change over time. Thus, using method 900, sensor data from the $CO_2$ sensor is received at 902. Data from other $CO_2$ sensors in other vehicles in the region are also received at 904. These other $CO_2$ sensors are comparable but may be more reliable for various reasons. For example, the $CO_2$ sensors may have been more recently calibrated and/or are newer. In addition, such $CO_2$ sensors are known to be of the same type or are otherwise comparable to the $CO_2$ sensor of vehicle 200. Consequently, data from these $CO_2$ sensors are used to adjust the $CO_2$ data from the sensor, at 906. For example, if the $CO_2$ sensor tends to drift to signals corresponding to larger $CO_2$ levels and data from other $CO_2$ sensors on other vehicles correspond to lower $CO_2$ levels, then the data from the $CO_2$ sensor on vehicle 200 is adjusted down at 906. Thus, if a vehicle is near another vehicle with a $CO_2$ sensor that is operating in a similar state, the $CO_2$ values should be similar and may be used in method 900. However, the in-cabin $CO_2$ levels may differ in different vehicles even when vehicles are close together. For example, the vehicles may have different numbers of occupants and/or different ventilation strategies. In such situations, the data from the other sensor may not be used because the expected values are very different. Thus method 900 might be carried out at a different time. In other embodiments, the data may be first corrected for singularities as discussed below, and then used in method 900.

In some embodiments, the calibration of method 900 occurs when there is reason to believe that nearby sensors should be the same. For example, if a vehicle is aggressively ventilated or just recently turned on, we can expect that an in-cabin $CO_2$ sensor for the vehicle should have similar values to an external $CO_2$ sensor for the vehicle (or another nearby vehicle). Thus, at 902 data from the in-cabin $CO_2$ sensor is received. At 904 data from the external $CO_2$ sensor is received. At 906, data from the external $CO_2$ sensor may be used to calibrate the in-cabin $CO_2$ sensor. In another embodiments, the lowest value observed by the in-cabin sensor over a period of time (1 week, for instance) is compared to the lowest value(s) of other similar vehicles (with newer sensors) over similar windows using method 900. In such embodiments, for example, the lowest $CO_2$ value for the in-cabin sensor for the time interval is received at 902. The lowest value(s) for in-cabin sensor(s) of other similar vehicle(s) are received at 904. At 906 these lowest values are compared, discrepancies accounted for and the in-cabin sensor calibrated.

Using method 900, data for sensors in vehicles that may be unavailable for normal calibration procedures may be calibrated to account for variations such as drift due to the age of the sensors. Method 900 may be performed for in-cabin environmental data sensors as well as external environmental data sensors. Thus, confidence in and reliability of environmental data from older sensors may be maintained.

Figure 10:
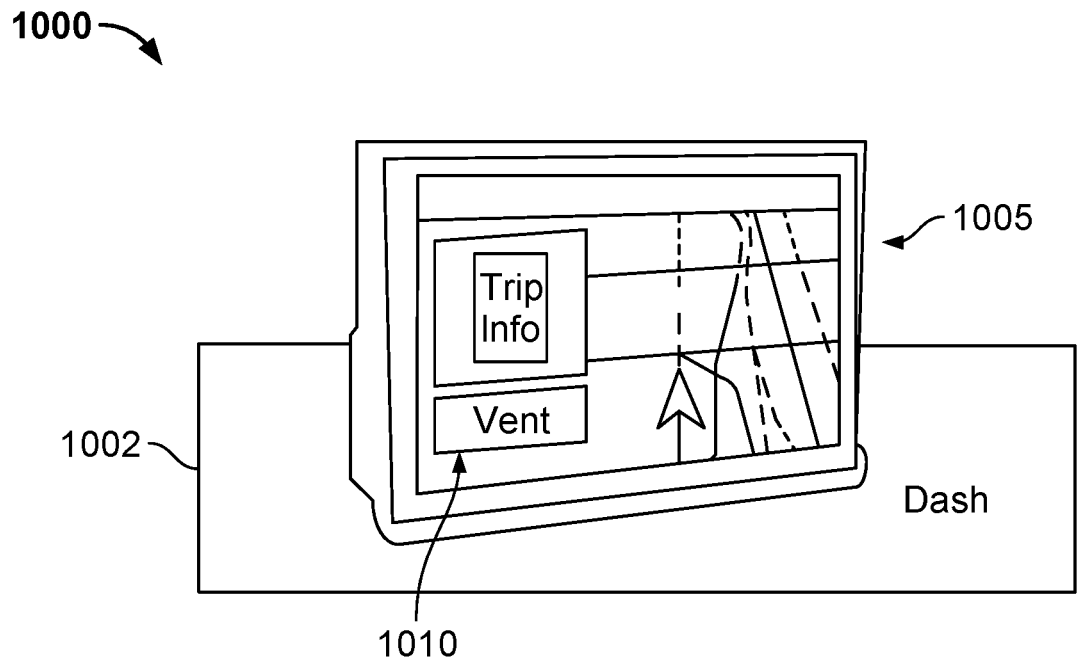
FIG. 10 is a diagram depicting an exemplary embodiment of a system for providing a ventilation notification.
Figure 11:
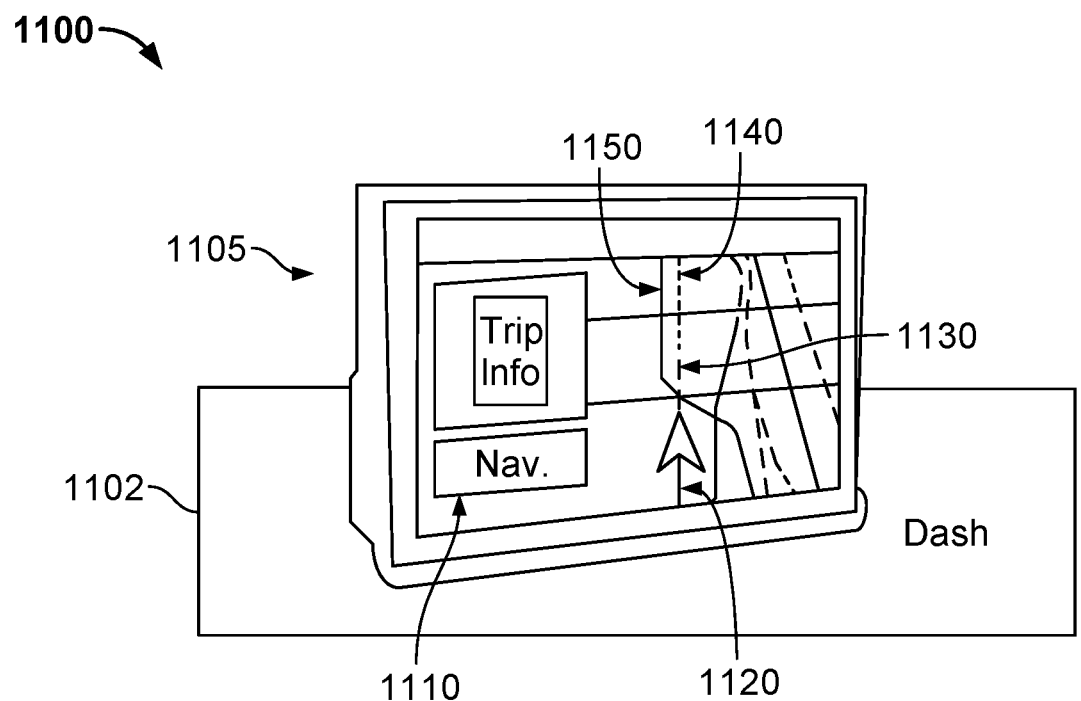
FIG. 11 is a diagram depicting an exemplary embodiment of a system for providing a navigation notification.

FIGS. 10-11 are diagrams depicting exemplary embodiments of systems 1000 and 1100 for providing notifications. FIG. 10 depicts a system for providing ventilation notifications in real time or near real time. System 1000 is mounted on dash 1002 and includes a display 1005. In the embodiment shown, display 1005 also includes a map and a pointer (arrowhead-shaped quadrilateral) that indicates the location and direction of the vehicle. Information is provided on display 1005. In addition, ventilation notification 1010 is provided. Ventilation notification 1010 indicates the mitigation that is recommended or being taken. For example, ventilation notification 1010 may be displayed if the vehicle windows are automatically opened or ventilation of the vehicle cabin is recommended based upon the in-cabin environmental data.

FIG. 11 depicts a system for providing navigation notifications in real time or near real time. System 1100 is mounted on dash 1102 and includes a display 1005. In the embodiment shown, display 1105 also includes a map and a pointer (arrowhead-shaped quadrilateral) that indicates the location and direction of the vehicle. Information is provided on display 1105. In addition, navigation notification 1110 is provided. Navigation notification 1110 indicates the mitigation related to the route is recommended or being taken. For example, navigation notification 1110 may be displayed if the vehicle is to change routes. For example, in the embodiment depicted in FIG. 11, portions of routes are shown as solid lines 1120 and 1150, dashed lines 1130 and a dotted line 1140. Solid lines 1120 indicate a route with low or acceptable levels of particular pollutants. Dashed lines 1130 indicate higher levels. Dotted lines 1140 indicate highest levels. Some these regions correspond to one or more road segments, such as road segments 304 and 306 discussed with respect to FIG. 3. Thus, navigation notification 1110 may suggest changing from the current route, which would traverse regions 1130 and 1140, to route 1150. The user may operate the vehicle to follow change to this route or the vehicle may automatically change routes. Thus, a user may be notified of mitigation actions and may take such actions. Further, information for the current trip may be provided to the user of the vehicle in real time or near real time.

Figure 12:
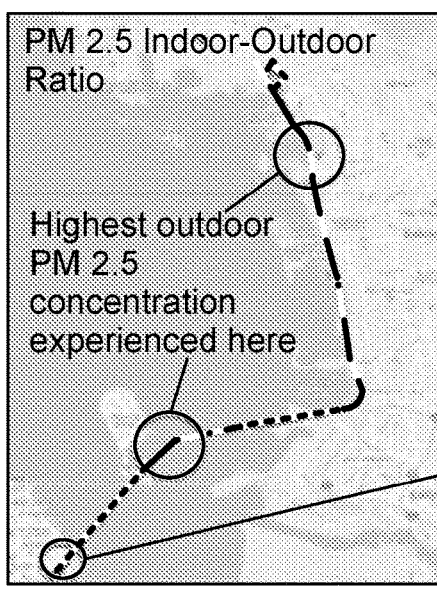
FIGS. 12-15 are diagrams depicting an exemplary embodiment of a system for providing commute information.

FIGS. 12-15 are diagrams depicting an exemplary embodiment of systems for providing commute information. FIGS. 12-15 are for explanatory purposes only. FIG. 12 depicts map 1200 in which the commute route traversed by the vehicle and its occupant(s) is shown and the levels of pollution visually indicated. For example, different portions of the route are highlighted in solid, dotted and dashed lines indicating varying levels of PM. In some embodiments, different colors or other mechanism may be used to highlight different levels of PM. Hot spots may thus be identified. Such hot spots have a higher concentration of elements of interest, for example pollution such as black carbon or conditions such as high $CO_2$. Based on the hot spots (e.g. size, shape, location, number) and other features of the region, a combination of mobile sensor systems and stationary sensor systems may be deployed. Hot spots are indicated in map 1200 by circles. Explanatory text is also provided.

Figure 13:
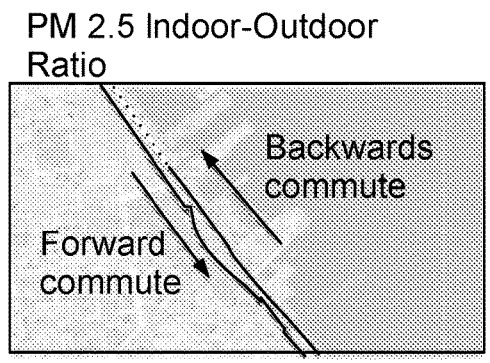
Figure 14:
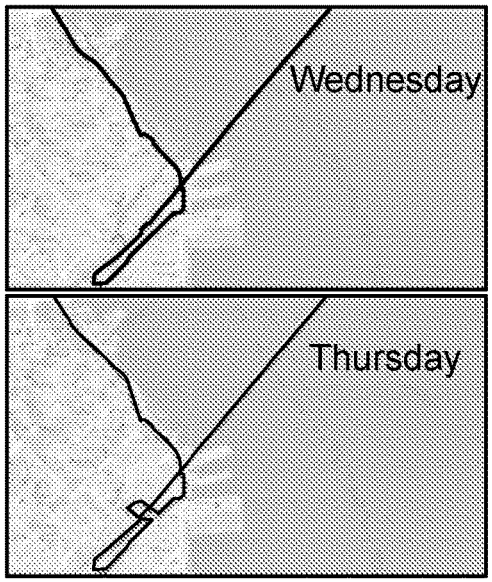
Figure 15:
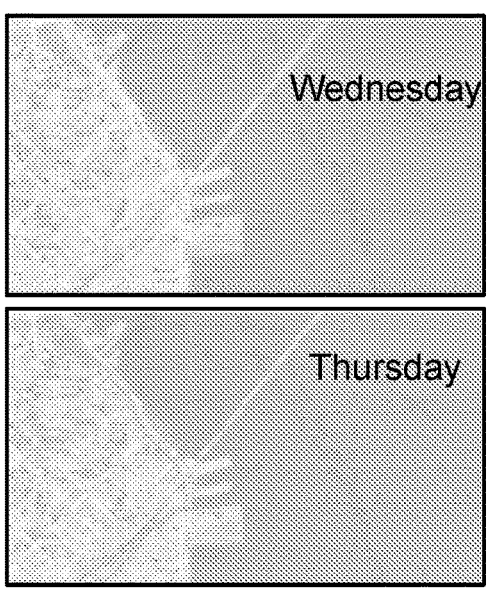

FIG. 13 depicts map 1300 in which two directions of the commute are shown. The direction of the commute is indicated by arrows. In some embodiments, portions of the route may be highlighted to draw the user's attention to particular portions of the route. For example, portions of the route with high levels of pollutant(s) may be drawn in red, use a thicker line, and/or have a different line configuration (e.g. dotted instead of solid). Explanatory text is also provided. FIGS. 14-15 depict maps 1400 and 1500, respectively, that compare the outdoor (external) levels of PM and indoor (in-cabin) levels of PM, respectively, on two different days. Routes are indicated. In some embodiments, portions of the route(s) may be highlighted to draw the user's attention to higher levels of certain pollutants. Explanatory text is also provided. Based on maps 1200, 1300, 1400, and 1500, a user may better understand their exposure to various pollutants during the commute. Action may then be taken to address issues with sufficiently high levels of pollutants. Thus, the users' health and cognition may be maintained or improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving external environmental data, comprising receiving the external environmental data from at least one of an external source separate from a vehicle and a sensor at the vehicle;
   receiving in-cabin environmental data, comprising receiving the in-cabin environmental data from at least one of the external source separate from the vehicle and an in-cabin sensor at the vehicle, wherein the external source includes a plurality of sensors on a plurality of vehicles within a particular distance of the vehicle;
   weighting the external environmental data based on at least a location of the external source, an age of a sensor corresponding to the external environmental data, an expected lifetime of the sensor corresponding to the external environmental data, an interval since a last calibration of the external sensor corresponding to the external environmental data, a vehicle speed, a time at which the external environmental data was collected, and a number of vehicles within a particular distance providing the external environmental data;
   weighting the in-cabin environmental data based on at least a location of the external source, an age of a sensor corresponding to the in-cabin environmental data, an expected lifetime of the sensor corresponding to the in-cabin environmental data, an interval since a last calibration of the sensor corresponding to the in-cabin environmental data, a vehicle speed, a time at which the in-cabin environmental data was collected, and a number of other vehicles providing the in-cabin environmental data;
   comparing at least one of the weighted external environmental data and/or the weighted in-cabin environmental data to one or more standards; and
   in the event that the at least one of the weighted external environmental data and/or weighted the in-cabin environmental data is equal to or exceeds the one or more standards, providing a mitigation action for an in-cabin environment of the vehicle based on the weighted external environmental data and the weighted in-cabin environmental data, comprising:
   performing one or more of the following:
   A) in response to a determination that the weighted in-cabin environmental data is equal to or exceeds the one or more standards, perform one or more of the following:
      turning off recirculation in the vehicle until the weighted in-cabin environmental data is less than the one or more standards;
      notifying occupants of the vehicle; and/or
      opening windows of the vehicle until the weighted external environmental data is less than the one or more standards; and/or
   B) in response to a determination that the weighted external environmental data is equal to or exceeds the one or more standards, perform one or more of the following:
      turning on recirculation in the vehicle until the weighted external environmental data is less than the one or more standards;
      closing windows of the vehicle until the weighted external environmental data is less than the one or more standards; and/or
      engaging a filter in a ventilation system of the vehicle until the weighted external environmental data is less than the one or more standards.

2. The method of claim 1 wherein the external source includes a plurality of sensor data platforms on a plurality of vehicles within a particular distance of the vehicle.

3. The method of claim 1, wherein the providing further includes:
   providing the mitigation action based an additional predetermined data distinct from the in-cabin environmental data and the external environmental data.

4. The method of claim 3 wherein the providing the mitigation action based on the additional predetermined data further includes:
   utilizing the additional predetermined data if at least one of the external environmental data and the in-cabin environmental data is unavailable.

5. The method of claim 1, wherein the providing the mitigation action further includes:
   determining the mitigation action based on an environmental quality mitigation feature in a ventilation system of the vehicle.

6. The method of claim 1, further comprising:
   calibrating a sensor corresponding to the at least one of the external environmental data and the in-cabin environmental data, the calibrating being based on at least one of the age of the sensor, an expected lifetime of the sensor, and calibration data from at least one sensor having at least one age not greater than the age of the sensor.

7. The method of claim 1, wherein the mitigation action includes ventilating the vehicle, enclosing the vehicle, engaging an air recirculation system, incorporating an air filtration system into a ventilation system of the vehicle, and providing an alternate route.

8. The method of claim 1, further comprising:
mapping the external environmental data and the in-cabin environmental data.

\* \* \* \* \*